US006980220B1

(12) United States Patent
Politis

(10) Patent No.: US 6,980,220 B1
(45) Date of Patent: Dec. 27, 2005

(54) RUN-BASED COMPOSITING

(75) Inventor: George Politis, Macquarie Fields (AU)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 09/644,702

(22) Filed: Aug. 24, 2000

(30) Foreign Application Priority Data

Aug. 27, 1999 (AU) .............................................. PQ2519

(51) Int. Cl.[7] .............................. G09G 5/02; G09G 5/00; G06K 9/34; G06K 9/00
(52) U.S. Cl. ....................... 345/592; 345/619; 345/629; 382/164; 382/254
(58) Field of Search ................................. 345/592, 619, 345/629; 382/164, 254, 284, 245; 358/1.19; 715/500; 348/578

(56) References Cited

U.S. PATENT DOCUMENTS

| 5,241,372 A | * | 8/1993 | Ohba ............................. 348/578 |
| 5,485,568 A | * | 1/1996 | Venable et al. ............... 715/500 |
| 5,542,031 A | * | 7/1996 | Douglass et al. ............ 358/1.15 |
| 5,724,494 A | * | 3/1998 | Politis ............................ 345/592 |
| 5,936,616 A | * | 8/1999 | Torborg et al. ............... 345/555 |
| 6,078,691 A | | 6/2000 | Luttmer ......................... 382/235 |
| 6,366,289 B1 | * | 4/2002 | Johns ............................ 345/543 |
| 6,486,888 B1 | * | 11/2002 | Fushiki et al. ............... 345/592 |

FOREIGN PATENT DOCUMENTS

| EP | 855680 | 7/1998 |
| GB | 2245463 | 1/1992 |

OTHER PUBLICATIONS

Brian C. Smith, et al., "Algorithms for Manipulating Compressed Images," IEEE Computer Graphics and Applications, Sep. 1993.
Ivan Kadar, et al., "Signal Processing, Sensor Fusion, and Target Recognition II," SPIE Proceedings, vol. 1955, pp. 364–376, Apr. 12–14, 1993.
Brian C. Smith, et al., "Algorithms for Manipulating Compressed Images, " IEEE Computer Graphics and Applications, Sep. 1993.

* cited by examiner

Primary Examiner—Matthew C. Bella
Assistant Examiner—Anthony Blackman
(74) Attorney, Agent, or Firm—Fitzpatrick, Cella, Harper & Scinto

(57) ABSTRACT

A method of compositing two input image components (101, 102) to form at least one output image component (103, 104, 105) is disclosed. Each of the image components (101–105) is formed of run-based data and categorised by one of a plurality of data types and at least one of the input data types is a non-flat colour or non-flat opacity blend of at least linear degree. An output data type is determined from the input data types and a predetermined compositing operation to be applied to the input image components (101, 102). An output run (103, 104, 105) of the output data type is produced at an area of intersection of the two input runs (101, 102).

121 Claims, 8 Drawing Sheets

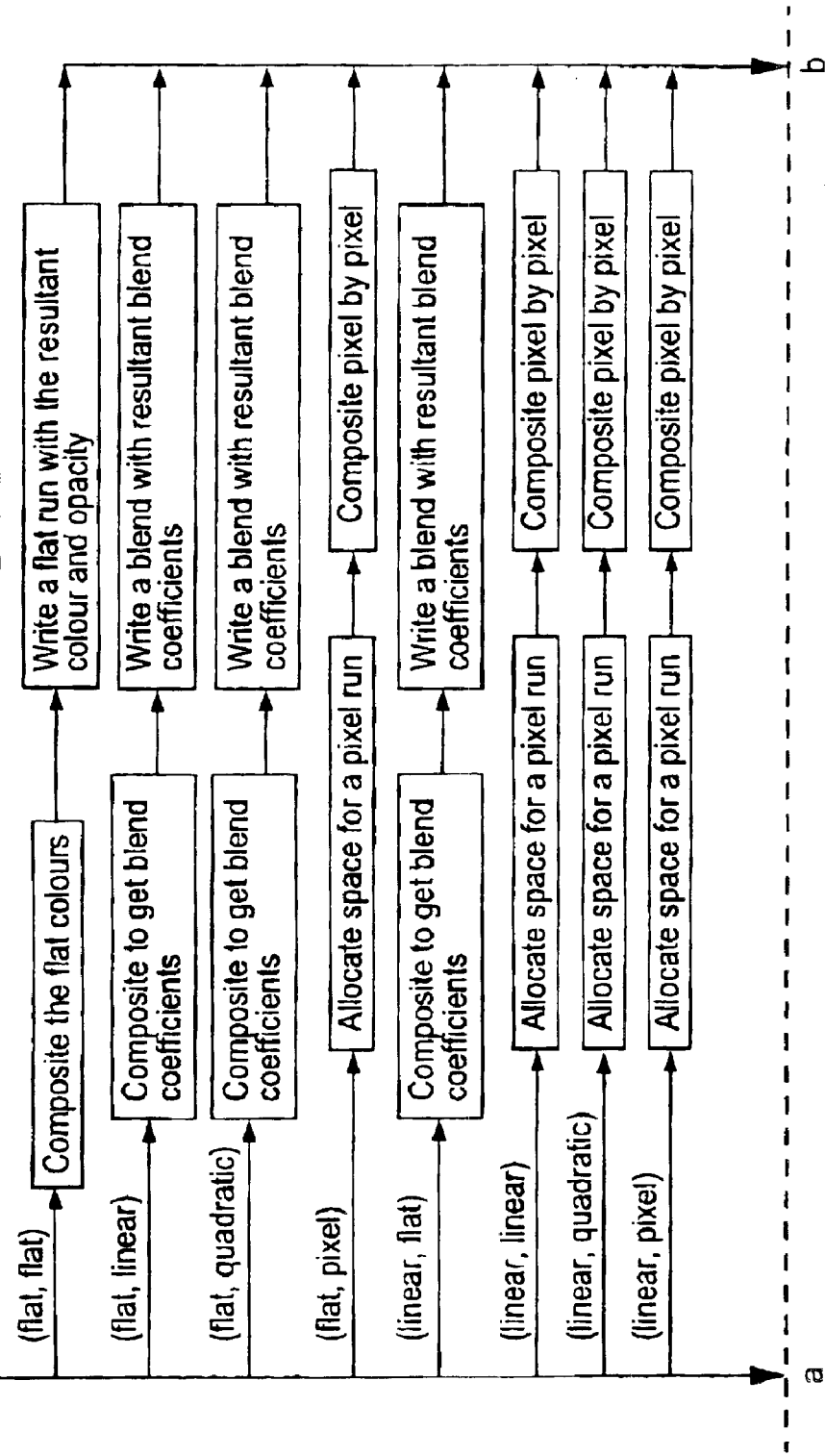

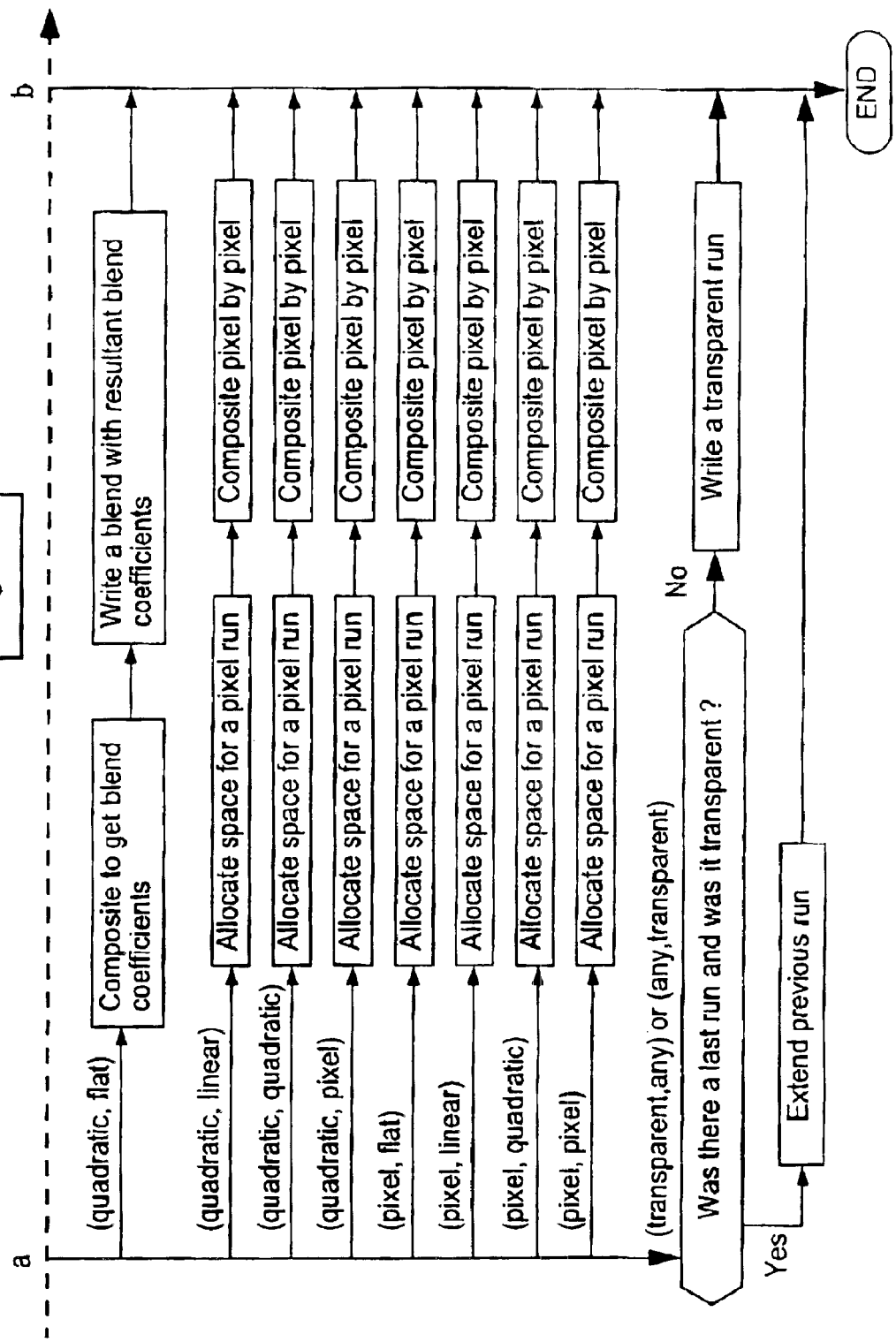

RUN-BASED COMPOSITING

COPYRIGHT NOTICE

This patent specification contains material which is subject to copyright protection. The copyright owner has no objection to the reproduction of this patent specification or related materials from associated patent office files for the purposes of review, but otherwise reserves all copyright whatsoever.

FIELD OF THE INVENTION

The present invention generally relates to the compositing of graphical images for either printing or for display on a display screen, and more specifically, to data formats and operations for providing composited graphical images.

BACKGROUND

The creation of digital images by compositing multiple component images is well known. Although early compositing techniques manipulated only opaque component images, over recent years the use of compositing techniques relying upon alpha channel opacity values has become increasingly popular. An introduction to compositing techniques is found in the article "Compositing Digital Images" Porter, T.; Duff, T.; SIGGRAPH 1984 pages 253–259 (hereinafter referred to as Porter & Duff).

Although the component images may be stored in compressed form it is generally necessary, using traditional compositing techniques, to convert these compressed component images to uncompressed pixel data prior to performing compositing operations. This can result in having to composite large numbers of pixels on a pixel-by-pixel basis. The compositing together of large pixel-based images requires large amounts of computer memory, this requirement increasing at approximately the square of the image resolution. In addition to the computer memory requirements, the compositing together on a pixel-by-pixel basis of large images may also require large amounts of computational resources.

Component images can be stored in compressed form using run-length encoding, or some other run-based technique. In such circumstances, the component images may be described by an ordered sequence of runs, each run having a pixel value (or colour) and a number of consecutive pixels with that pixel value. An example of prior art compositing of two such components is shown in the system 200 of FIG. 2 where a first component 202 includes a pixel value $P_1$ and a number $N_1$, the number $N_1$ being the number of consecutive pixel locations at which the colour $P_1$ is reproduced in the component image 202. Another component 204 is likewise described. In order to perform compositing, each component 202 and 204 is decompressed (decoded) to provide corresponding pixel data runs 206 and 208 respectively which are then used as inputs to a compositing operation 210. The compositing operation 210 outputs a composited pixel run 212 which can then be encoded to provide an output component 214 of corresponding form to the input components 202 and 204. The deficiencies discussed above apply to the system 200.

The creation of digital images from multiple component images can often be represented by an expression tree, or similar hierarchical structure, which describes the structure of the image creation utilising a series of operators. In cases where the image is created and then later edited and recreated, it can be advantageous to cache the results of the composition at every operator node of the tree, since then only the modified parts of the tree will then need to be recomposited. This reduces the number of computations required for the recreation of the image. As the cached data is typically in the form of pixels, the caching of this data may required large amounts of computer memory. Hence there is advantage in using an image compression scheme provided that such compressed images can be composited without additional computational overhead.

Computer generated images often have large areas of uniform colour and opacity. Compositing two such images often involves applying identical pixel with pixel compositing operations over and over again. The need to decode inputs and encode composited results further exacerbates problems of memory utilisation and processing speed.

The article "Merging and Transformation of Raster Images for Cartoon Animation", Wallace, B. A.; SIGGRAPH 1981 Proc., pages 253–262 discloses and discusses the benefits of the compositing of run-length encoded images without a need to decode the runs. European Patent Publication No. EP 0 855 680 A1 describes variations of a particular arrangement for this process. However, of the various configurations described, which in some way purport to account for transparency in at least one component input image, none provide for the implementation of compositing operations involving transparency components in a fashion corresponding to that of pixel-by-pixel alpha-channel compositing. For example, EP 0 855 680 A1 describes applying a weighting factor to, or averaging, pixels values in runs from two encoded images in order to obtain an encoded composite result from encoded input data. Whilst such may be useful for wholly opaque images, or runs having constant colour, such does not provide for the full gamut of compositing operations including those described by Porter & Duff, or for where the input components are non-uniform. Simply speaking, EP 0 855 680 A1 treats transparency as an additional colour, rather than as an additional colour channel (an alpha channel). Wallace disclosed a general opacity channel in images but only described a MERGE operator, equivalent to the Porter & Duff OVER operator.

Advanced graphics systems can describe run-based input components in a variety of forms, such as colour blends, or simply as uncompressed pixels. For example, where a pixel image is to be composited with a graphic object image using a particular operation, each scan line of the pixel image may be still be described as a single run as opposed to a series of runs, many perhaps one pixel long, of different colour values.

It is desirable therefore to provide an enhanced arrangement having a capacity to receive a wide variety of run-based input data types and be able to perform a wide variety of traditional compositing operations.

SUMMARY OF THE INVENTION

In accordance with one aspect of the present invention, there is disclosed a method of compositing two input image components to form at least one output image component, each of said image components being formed of run-based data and categorised by one of a plurality of data types, at least one of the input data types being a non-flat colour or non-flat opacity blend of at least linear degree, the method comprising the steps of:

determining an output data type from the input data types and a predetermined compositing operation to be applied to the input image components;

producing an output run of said output data type at an area of intersection of the two input runs.

In accordance with another aspect of the present invention, there is disclosed a method of compositing two input images to form at least one output image, each of said images being formed of scan lines comprising run-based data and each run categorised by one of a plurality of data types, at least one of the input data types being a non-flat colour or non-flat opacity blend of at leats linear degree, the method comprising the steps of:

for each output scan line select a first scan line from the first image and a second scan line from the second image;

for each area of intersection of a run from said first scan line and a run from said second scan line determining an output data type from the input data types and a predetermined compositing operation to be applied to the input image components;

producing an output run of said output data type at an area of intersection of the two input runs;

adjust run selected from said first scan line or select a new run from first scan line to permit further compositing;

adjust run selected from said second scan line or select a new run from second scan line to permit further compositing.

In accordance with still another aspect of the present invention, there is disclosed an apparatus for compositing two input image components to form at least one output image component, each of said image components being formed of run-based data and categorised by one of a plurality of data types, at least one of the input data types being a non-flat colour or non-flat opacity blend of at least linear degree, the apparatus comprising:

means for determining an output data type from the input data types and a predetermined compositing operation to be applied to the input image components;

means for producing an output run of said output data type at an area of intersection of the two input runs.

In accordance with still another aspect of the present invention, there is disclosed an apparatus for compositing two input images to form at least one output image, each of said images being formed of scan lines comprising run-based data and each run categorised by one of a plurality of data types, at least one of the input data types being a non-flat colour or non-flat opacity blend of at leats linear degree, the apparatus comprising:

means for selecting a first scan line from the first image and a second scan line from the second image for each output scan line;

means for determining an output data type from the input data types and a predetermined compositing operation to be applied to the input image components, for each area of intersection of a run from said first scan line and a run from said second scan line;

means for producing an output run of said output data type at an area of intersection of the two input runs;

means for adjusting run selected from said first scan line or select a new run from first scan line to permit further compositing;

means for adjusting run selected from said second scan line or select a new run from second scan line to permit further compositing.

In accordance to still another aspect of the present invention there is provided a computer readable medium, having a program recorded thereon, where the program is configured to make a computer execute a procedure to composite two input image components to form at least one output image component, each of said image components being formed of run-based data and categorised by one of a plurality of data types, at least one of the input data types being a non-flat colour or non-flat opacity blend of at least linear degree, the program comprising:

code for determining an output data type from the input data types and a predetermined compositing operation to be applied to the input image components; and code for producing an output run of said output data type at an area of intersection of the two input runs.

In accordance to still another aspect of the present invention there is provided a computer readable medium, having a program recorded thereon, where the program is configured to make a computer execute a procedure to composite two input images to form at least one output image, each of said images being formed of scan lines comprising run-based data and each run categorised by one of a plurality of data types, at least one of the input data types being a non-flat colour or non-flat opacity blend of at leats linear degree, the program comprising:

for each output scan line code for select a first scan line from the first image and a second scan line from the second image;

for each area of intersection of a run from said first scan line and a run from said second scan line code for determining an output data type from the input data types and a predetermined compositing operation to be applied to the input image components;

code for producing an output run of said output data type at an area of intersection of the two input runs;

code for adjusting run selected from said first scan line or select a new run from first scan line to permit further compositing;

code for adjusting run selected from said second scan line or select a new run from second scan line to permit further compositing.

BRIEF DESCRIPTION OF THE DRAWINGS AND APPENDIX

A preferred embodiment of the present invention will now be described as part of a run-based compositing tool, with reference to the drawings and appendix, in which:

FIG. 8 is a flowchart of the writing of a run of Tables 1 to 8;

DETAILED DESCRIPTION

Figure 9:
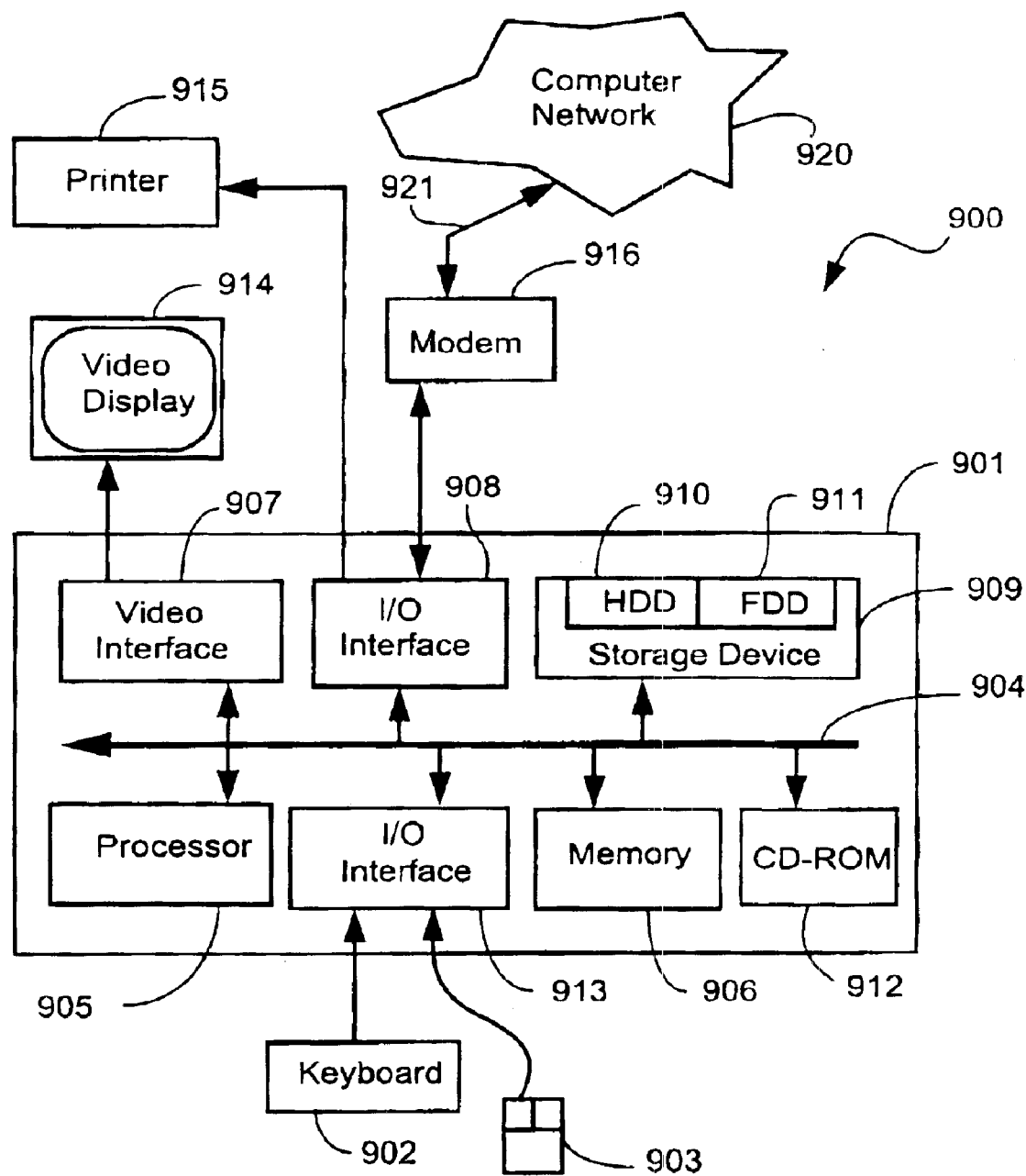
FIG. 9 is a schematic block diagram representation of a general purpose computer within which the run-based compositing tool may operate; and Appendix A provides pseudocode representation of the processing for the OVER operator as used in the run-based compositing tool.

The preferred embodiment is implemented as part of a run-based compositing tool which has been developed to provide for run-based compositing of a variety of input data types and compositing operations. The run-based compositing tool is preferably practiced using a conventional general-purpose computer system 900, such as that shown in FIG. 9, wherein the processes described in relation to FIGS. 1 to 8 and Appendix A may be implemented as software, such as an application program executing within the computer system 900. In particular, the compositing processes are effected by instructions in the software that are carried out by the computer. The software may be divided into two separate parts; one part for carrying out the compositing processes, and another part to manage an interface between the compositing processes and the user or a graphics system. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for compositing in accordance with the embodiments of the invention.

The computer system 900 comprises a computer module 901, input devices such as a keyboard 902 and mouse 903, output devices including a printer 915 and a display device 914. A Modulator-Demodulator (Modem) transceiver device 916 is used by the computer module 901 for communicating to and from a communications network 920, for example connectable via a telephone line 921 or other functional medium. The modem 916 can be used to obtain access to the Internet, and other network systems, such as a Local Area Network (LAN) or a Wide Area Network (WAN), which may provide a source of input data or a destination for composited data.

The computer module 901 typically includes at least one processor unit 905, a memory unit 906, for example formed from semiconductor random access memory (RAM) and read only memory (ROM), input/output (I/O) interfaces including a video interface 907, and an I/O interface 913 for the keyboard 902 and mouse 903 and optionally a joystick (not illustrated), and an interface 908 for the modem 916. A storage device 909 is provided and typically includes a hard disk drive 910 and a floppy disk drive 911. A magnetic tape drive (not illustrated) may also be used. A CD-ROM drive 912 is typically provided as a non-volatile source of data. The components 905 to 913 of the computer module 901, typically communicate via an interconnected bus 904 and in a manner which results in a conventional mode of operation of the computer system 900 known to those in the relevant art. Examples of computers on which the embodiments can be practised include IBM-PC's and compatibles, Sun Sparcstations or alike computer systems evolved therefrom.

Typically the application program of the run-based compositing tool is resident on the hard disk drive 910 and read and controlled in its execution by the processor 905. Intermediate storage of the program and any data fetched from the network 920 may be accomplished using the semiconductor memory 906, possibly in concert with the hard disk drive 910. In some instances, the application program may be supplied to the user encoded on a CD-ROM or floppy disk and read via the corresponding drive 912 or 911, or alternatively may be read by the user from the network 920 via the modem device 916. Still further, the software can also be loaded into the computer system 900 from other computer readable medium including magnetic tape, a ROM or integrated circuit, a magneto-optical disk, a radio or infra-red transmission channel between the computer module 901 and another device, a computer readable card such as a PCMCIA card, and the Internet and Intranets including e-mail transmissions and information recorded on websites and the like. The foregoing is merely exemplary of relevant computer readable mediums. Other computer readable mediums may be practiced without departing from the scope and spirit of the invention.

The run-based compositing tool, may alternatively be implemented in dedicated hardware such as one or more integrated circuits performing the functions or sub functions of compositing processes. Such dedicated hardware may include graphic processors, digital signal processors, or one or more microprocessors and associated memories.

A. Compositing Operators

In the run-based compositing tool, a compositing operator is used whenever two images are combined to produce a third image. Below are given all the compositing operators used in the run-based compositing tool. These operators are taken either directly, or are derived from, those described by Porter & Duff. Note that the terms "left operand" and "right operand" refer to the operand positions in regard to the compositing expression. Spatially, the operands may be in any position relative to each other.

Within the compositing operators the following conventions are observed:

$a_{co}$ is the premultiplied colour data for the left operand;

$b_{co}$ is the premultiplied colour data for the right operand;

$a_o$ is the opacity channel data for the left operand;

$b_o$ is the opacity channel data for the right operand; and clamp indicates the output is to be clamped to the natural range.

The OVER Operator $$<a_{co},a_o> \text{ over } <b_{co},b_o> = <a_{co}+(1-a_o)b_{co}, a_o+b_o-a_o b_o>.$$

The IN Operator $$<a_{co},a_o> \text{ in } <b_{co},b_o> = <a_{co}b_o, a_o b_o>.$$

The OUT Operator $$<a_{co},a_o> \text{ out } <b_{co},b_o> = <a_{co}(1-b_o), a_o(1-b_o)>.$$

The ATOP Operator $$<a_{co},a_o> \text{ atop } <b_{co},b_o> = <a_{co}b_o+b_{co}(1-a_o), b_o>.$$

The UPON Operator $$<a_{co},a_o> \text{ upon } <b_{co},b_o> = <\text{clamp}(a_{co}b_o+b_{co}), \text{clamp}(a_o b_o+b_o)>.$$

The XOR Operator $$<a_{co},a_o> \text{ xor } <b_{co},b_o> = <a_{co}(1-b_o)+b_{co}(1-a_o),$$

$$a_o(1-b_o)+b_o(1-a_o)>.$$

The PLUS Operator $$<a_{co},a_o> \text{ plus } <b_{co},b_o> = <\text{clamp}(a_{co}+b_{co}), \text{clamp}(a_o+b_o)>.$$

The AND Operator $$<a_{co},a_o> \text{ and } <b_{co},b_o> = <\text{clamp}(a_{co}b_o+b_{co}a_o), \text{clamp}(2a_ob_o)>.$$

For purposes of clarity the output image of the run-based compositing tool is considered as the result of the composition of two images only and the area of the output image is restricted to the area of intersection of the two images.

B. Types of Run-length Encoded Data and Data Structures

The run-based compositing tool utilises the following types of run data:

transparent runs;

flat colour and opacity runs;

linear colour and/or opacity blend runs;

quadratic colour and linear opacity blend runs; and pixel runs.

Figure 3:
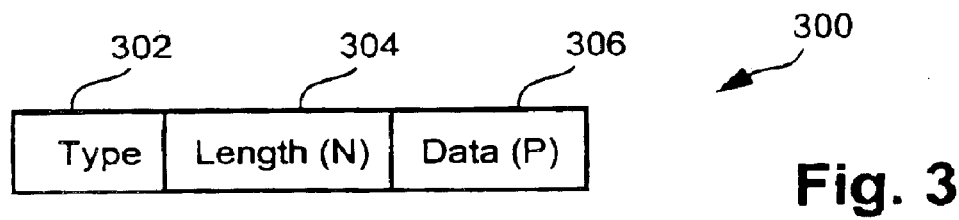
FIG. 3 depicts an encoding format used in the run-based compositing tool.

The run-based compositing tool utilises a data format 300 shown in FIG. 3 which includes traditional run-based components such as the pixel data value 306 and the number of pixel 304, but also a type designator 302 indicating which of the above types of run data a particular run represents.

Below are described the data structures of the various types of runs used in the preferred embodiment.

(i) Transparent Runs

Start X coordinate

Run length (ii) Flat Colour and Opacity Runs

Start X coordinate

Run length

Three colour channel values (typically RGB)

Opacity channel value (iii) Linear Colour or Opacity Blend Runs

Linear blends are defined to be blends in which the premultiplied colour varies linearly from one blend end point to the other blend end point. Because the definition refers to premultiplied colour either the unpremultiplied colour or the opacity (but not both) must be constant to achieve a linear blend.

Start X coordinate

Run length

Start colour (premultiplied)

Colour difference values (floating-point or fixed-point integer)

Start opacity

Opacity difference value (floating-point or fixed-point integer)

(iv) Quadratic Colour and Linear Opacity Blend Runs (known as Quadratic Blend runs)

Quadratic blend runs are defined to be blends where both the unpremultiplied colour and the opacity vary linearly between the blend end points thus resulting in quadratically varying premultiplied colour.

Start X coordinate

Run length

Start colour (premultiplied)

Initial Colour difference values (floating-point or fixed-point integer)

Colour double difference values (floating-point or fixed-point integer)

Start opacity

Opacity difference value (floating-point or fixed-point integer)—may be zero.

(v) Pixel Run

Start X coordinate;

Run length; and

Premultiplied colour and opacity pixel data.

In addition, it is often useful to have a flag in each run that indicates whether or not all the pixels represented by the run are opaque.

(vi) Run-length encoded Image Structure

A run-length encoded image comprises a number of scan lines of data each line comprising:

line number; and list of runs for that line; typically a linked list and typically grouped together in spans of contiguous runs. The runs are also typically in ascending X coordinate order.

The run-length encoded images used in the run-based compositing tool:

have ascending contiguous line numbers; and have linked lists of runs grouped together in spans of contiguous runs for each scan line. A delimiter is inserted at the end of each span.

(vii) Blends Of Higher Than Quadratic Polynomial Degree

It is possible during compositing to produce blend runs of higher polynomial degree than those mentioned above. For example, compositing two blends with linearly varying opacity using the OVER operator will produce a blend with quadratically varying opacity, or, compositing two blends with quadratically varying premultiplied colour and linearly varying opacity will give rise to a blend with cubically varying premultiplied colour. This will be apparent from the equation for the OVER compositing operator noted above. In the run-based compositing tool, in order to limit the number of different run types to simplify the processing, such complicated compositing operations are handled in a traditional fashion to produce pixel runs in such cases.

C. Compositing Outlines

C.1 Definition

C.1.1 The following definitions are used throughout the description of the compositing operations:

$a_{co}$ is the premultiplied colour data for the left operand;

$b_{co}$ is the premultiplied colour data for the right operand;

$a_o$ is the opacity channel data for the left operand and;

$b_o$ is the opacity channel data for the right operand;

$\Delta$ signifies the forward difference, in which it is defined:

$$\Delta<c,o>=<\Delta c,\Delta o> \text{ and}$$

$$k<c,o>=<kc,ko>; \text{ and}$$

$\Delta\Delta$ signifies the second forward difference (double difference).

C.2 Overview

C.2.1 Every run has an associated interval. The present section focuses on the result of compositing a pair of runs together within the intersection of the runs' intervals. If the two runs do not have matching starting x-coordinates, then the run with the lesser starting x-coordinate will need to have the "subrun" that starts at the other run's x-coordinate calculated.

C.2.2 Where two runs do not overlap, the result is as if the run were composited with a transparent run.

C.3 Description of the OVER Operator Processing

C.3.0.1 The following embodiment details the single compositing operator OVER:

C.3.0.2 $<a_{co},a_o>$ over $<b_{co},b_o> = <a_{co}+(1-a_o)b_{co}, a_o+b_o-a_o b_o>$.

C.3.0.3 The run-based compositing tool utilises the following types of run data:

Transparent runs

Flat colour and opacity runs

Linear colour or opacity blend runs

Quadratic colour and linear opacity blend runs

Pixel runs

C.3.0.4 For purposes of simplicity, focus is on constructing the output image within the area of intersection.

C.3.1 Features Specific To The OVER Operator

C.3.1.1 It is to be noted that whenever a run from the left-hand operand is found to be opaque then a copy of that opaque run can be made in the output without nay compositing (see the compositing operator above).

C.3.1.2 Whenever either operand is transparent, the result is a copy of the other operand.

C.3.2 Compositing Result Types

C.3.2.1 Table 1 summarises the result of compositing one run A OVER another run B.

TABLE 1

| A's type/B's type | flat | linear | quadratic | pixel | transparent |
|---|---|---|---|---|---|
| flat | flat | linear | quadratic | pixel | flat |
| linear | linear | pixel | pixel | pixel | linear |
| quadratic | quadratic | pixel | pixel | pixel | quadratic |
| pixel | pixel | pixel | pixel | pixel | pixel |
| transparent | flat | linear | quadratic | pixel | transparent |

C.3.3 Compositing Implementation

C.3.3.1 flat run OVER flat run

Calculate the colour and opacity of the resulting flat run using the OVER equation.

C.3.3.2 flat run OVER linear blend run

Calculate the starting colour and opacity of the resulting linear blend run using the OVER equation.

Calculate the colour and opacity differences using the following equation $$\Delta(<a_{co},a_o> \text{ over } <b_{co},b_o>) = (1-a_o)\Delta<b_{co},b_o>.$$

C.3.3.3 flat run OVER quadratic blend run

Calculate the starting colour and opacity of the resulting quadratic blend run using the OVER equation.

Calculate the colour and opacity starting differences using the following equation $$\Delta(<a_{co},a_o> \text{ over } <b_{co},b_o>) = (1-a_o)\Delta<b_{co},b_o>.$$

Calculate the colour double differences using this equation $$\Delta\Delta(<a_{co},a_o> \text{ over } <b_{co},b_o>) = (1-a_o)<\Delta\Delta b_{co}, 0>.$$

C.3.3.4 flat run OVER pixel run

Calculate the colour and opacity of each pixel in the resulting pixel run using the OVER equation.

C.3.3.5 flat run OVER transparent run

Copy the flat run.

C.3.3.6 linear blend run OVER flat run

Calculate the starting colour and opacity of the resulting linear blend run using the OVER equation.

Calculate the colour and opacity differences using the following equation $$\Delta(<a_{co},a_o> \text{ over } <b_{co},b_o>) = \Delta<a_{co},a_o> - \Delta a_o <b_{co},b_o>.$$

C.3.3.7 linear blend run OVER linear blend run

Calculate the colour and opacity of each pixel in the resulting pixel run using the OVER equation C.3.3.8 linear blend run OVER quadratic blend run Calculate the colour and opacity of each pixel in the resulting pixel run using the OVER equation.

C.3.3.9 linear blend run OVER pixel run

Calculate the colour and opacity of each pixel in the resulting pixel run using the OVER equation.

C.3.3.10 linear blend run OVER transparent run

Copy the linear blend run.

C.3.3.11 quadratic blend run OVER flat run

Calculate the starting colour and opacity of the resulting quadratic blend run using the OVER equation.

Calculate the colour and opacity starting differences using the following equation $$\Delta(<a_{co},a_o> \text{ over } <b_{co},b_o>) = \Delta<a_{co},a_o> - \Delta a_o <b_{co},b_o>.$$

and the colour double differences using this equation $$\Delta\Delta(<a_{co},a_o> \text{ over } <b_{co},b_o>) = <\Delta\Delta a_{co}, 0>.$$

C.3.3.12 quadratic blend run OVER linear blend run

Calculate the colour and opacity of each pixel in the resulting pixel run using the OVER equation.

C.3.3.13 quadratic blend run OVER quadratic blend run

Calculate the colour and opacity of each pixel in the resulting pixel run using the OVER equation.

C.3.3.14 quadratic blend run OVER pixel run

Calculate the colour and opacity of each pixel in the resulting pixel run using the OVER equation.

C.3.3.15 quadratic blend run OVER transparent run

Copy the quadratic blend run.

C.3.3.16 pixel run OVER flat run

Calculate the colour and opacity of each pixel in the resulting pixel run using the OVER equation.

C.3.3.17 pixel run OVER linear blend run

Calculate the colour and opacity of each pixel in the resulting pixel run using the OVER equation.

C.3.3.18 pixel run OVER quadratic blend run

Calculate the colour and opacity of each pixel in the resulting pixel run using the over equation.

C.3.3.19 pixel run OVER pixel run

Calculate the colour and opacity of each pixel in the resulting pixel run using the OVER equation.

C.3.3.20 pixel run OVER transparent run

Copy the pixel run.

C.3.3.21 transparent run OVER flat run

Copy the flat run.

C.3.3.22 transparent run OVER linear blend run
  Copy the linear blend run.
C.3.3.23 transparent run OVER quadratic blend run
  Copy the quadratic blend run.
C.3.3.24 transparent run OVER pixel run
  Copy the pixel run.
C.3.3.25 transparent run OVER transparent run
  Write a transparent run.
C.4 Outline Of The IN Operator Processing
C.4.0.26 The compositing operator for the IN operator is:

$$<a_{co},a_o> \text{ in } <b_{co},b_o> = <a_{co}b_o,a_ob_o>.$$

C.4.1 Features Specific To The IN Operator
C.4.1.1 It is to be noted that whenever a run from the right-hand operand is found to be opaque then a copy of the run from the left-hand operand can be made in the output without any compositing (see the compositing operator above).
C.4.1.2 Whenever either operand is transparent, the result is a transparent run.
C.4.2 Compositing Result Types
C.4.2.1 Table 2 summarises the result of compositing one run A IN another run B.

TABLE 2

| A's type/B's type | flat | linear | quadratic | pixel | transparent |
| --- | --- | --- | --- | --- | --- |
| flat | flat | linear | linear | pixel | transparent |
| linear | linear | pixel | pixel | pixel | transparent |
| quadratic | quadratic | pixel | pixel | pixel | transparent |
| pixel | pixel | pixel | pixel | pixel | transparent |
| transparent | transparent | transparent | transparent | transparent | transparent |

C.4.3 Compositing Implementation
C.4.3.1 flat run IN flat run
  Calculate the colour and opacity of the resulting flat run using the IN equation.
C.4.3.2 flat run IN linear blend run
  Calculate the starting colour and opacity of the resulting linear blend run using the IN equation.
  Calculate the colour and opacity differences using the following equation $$\Delta(<a_{co},a_o> \text{ in } <b_{co},b_o>) = \Delta b_o <a_{co},a_o>.$$

C.4.3.3 flat run IN quadratic blend run
  Calculate the starting colour and opacity of the resulting linear blend run using the IN equation.
  Calculate the colour and opacity differences using the following equation $$\Delta(<a_{co},a_o> \text{ in } <b_{co},b_o>) = \Delta b_o <a_{co},a_o>.$$

C.4.3.4 flat run IN pixel run
  Calculate the colour and opacity of each pixel in the resulting pixel run using the IN equation.
C.4.3.5 flat run IN transparent run
  Write a transparent run.
C.4.3.6 linear blend run IN flat run
  Calculate the starting colour and opacity of the resulting linear blend run using the IN equation.
  Calculate the colour and opacity differences using the following equation $$\Delta(<a_{co},a_o> \text{ in } <b_{co},b_o>) = b_o \Delta <a_{co},a_o>.$$

C.4.3.7 linear blend run IN linear blend run
  Calculate the colour and opacity of each pixel in the resulting pixel run using the IN equation.
C.4.3.8 linear blend run IN quadratic blend run
  Calculate the colour and opacity of each pixel in the resulting pixel run using the IN equation.
C.4.3.9 linear blend run IN pixel run
  Calculate the colour and opacity of each pixel in the resulting pixel run using the IN equation.
C.4.3.10 linear blend run IN transparent run
  Write a transparent run.
C.4.3.11 quadratic blend run IN flat run
  Calculate the starting colour and opacity of the resulting quadratic blend run using the IN equation.
  Calculate the colour and opacity starting differences using the following equation $$\Delta(<a_{co},a_o> \text{ in } <b_{co},b_o>) = b_o \Delta <a_{co},a_o>.$$

and the colour double differences using this equation $$\Delta\Delta(<a_{co},a_o> \text{ in } <b_{co},b_o>) = <b_o \Delta\Delta a_{co}, 0>.$$

C.4.3.12 quadratic blend run IN linear blend run
  Calculate the colour and opacity of each pixel in the resulting pixel run using the IN equation.
C.4.3.13 quadratic blend run IN quadratic blend run
  Calculate the colour and opacity of each pixel in the resulting pixel run using the IN equation.
C.4.3.14 quadratic blend run IN pixel run
  Calculate the colour and opacity of each pixel in the resulting pixel run using the IN equation.
C.4.3.15 quadratic blend run IN transparent run
  Write a transparent run.
C.4.3.16 pixel run IN flat run
  Calculate the colour and opacity of each pixel in the resulting pixel run using the IN equation.
C.4.3.17 pixel run IN linear blend run
  Calculate the colour and opacity of each pixel in the resulting pixel run using the IN equation.
C.4.3.18 pixel run IN quadratic blend run
  Calculate the colour and opacity of each pixel in the resulting pixel run using the IN equation.
C.4.3.19 pixel run IN pixel run
  Calculate the colour and opacity of each pixel in the resulting pixel run using the IN equation.

C.4.3.20 pixel run IN transparent run
   Write a transparent run.
C.4.3.21 transparent run IN flat run
   Write a transparent run.
C.4.3.22 transparent run IN linear blend run
   Write a transparent run.
C.4.3.23 transparent run IN quadratic blend run
   Write a transparent run.
C.4.3.24 transparent run IN pixel run
   Write a transparent run.
C.4.3.25 transparent run IN transparent run
   Write a transparent run.
C.5 Outline Of The OUT Operator Processing
C.5.0.26 The compositing operator for the OUT operator is:

$$<a_{co},a_o> \text{ out } <b_{co},b_o> = <a_{co}(1-b_o), a_o(1-b_o)>.$$

C.5.1 Features Specific To The OUT Operator
C.5.1.1 It is to be noted that whenever a run from the right-hand operand is found to be opaque then a transparent run can be made in the output without any compositing (see the compositing operator above).
C.5.1.2 Whenever the left-hand operand is transparent, the result is a transparent run.
C.5.1.3 Whenever the right-hand operand is transparent, the result is a copy of the other operand.
C.5.2 Compositing Result Types
C.5.2.1 Table 3 summarises the result of compositing one run A OUT another run B.

TABLE 3

| A's type/B's type | flat | linear | quadratic | pixel | transparent |
|---|---|---|---|---|---|
| flat | flat | linear | linear | pixel | flat |
| linear | linear | pixel | pixel | pixel | linear |
| quadratic | quadratic | pixel | pixel | pixel | quadratic |
| pixel | pixel | pixel | pixel | pixel | pixel |
| transparent | transparent | transparent | transparent | transparent | transparent |

C.5.3 Compositing Implementation
C.5.3.1 flat run OUT flat run
   Calculate the colour and opacity of the resulting flat run using the OUT equation.
C.5.3.2 flat run OUT linear blend run
   Calculate the starting colour and opacity of the resulting linear blend run using the OUT equation.
   Calculate the colour and opacity differences using the following equation $$\Delta(<a_{co},a_o> \text{ out } <b_{co},b_o>) = -\Delta b_o <a_{co},a_o>.$$

C.5.3.3 flat run OUT quadratic blend run
   Calculate the starting colour and opacity of the resulting linear blend run using the OUT equation.
   Calculate the colour and opacity differences using the following equation $$\Delta(<a_{co},a_o> \text{ out } <b_{co},b_o>) = -b_o <a_{co},a_o>.$$

C.5.3.4 flat run OUT pixel run
   Calculate the colour and opacity of each pixel in the resulting pixel run using the OUT equation.
C.5.3.5 flat run OUT transparent run
   Copy the flat run.
C.5.3.6 linear blend run OUT flat run
   Calculate the starting colour and opacity of the resulting linear blend run using the OUT equation.
   Calculate the colour and opacity differences using the following equation $$\Delta(<a_{co},a_o> \text{ out } <b_{co},b_o>) = (1-b_o)\Delta<a_{co},a_o>.$$

C.5.3.7 linear blend run OUT linear blend run
   Calculate the colour and opacity of each pixel in the resulting pixel run using the OUT equation.
C.5.3.8 linear blend run OUT quadratic blend run
   Calculate the colour and opacity of each pixel in the resulting pixel run using the OUT equation.
C.5.3.9 linear blend run OUT pixel run
   Calculate the colour and opacity of each pixel in the resulting pixel run using the OUT equation.
C.5.3.10 linear blend run OUT transparent run
   Copy the linear blend run.
C.5.3.11 quadratic blend run OUT flat run
   Calculate the starting colour and opacity of the resulting quadratic blend run using the OUT equation.
   Calculate the colour and opacity starting differences using the following equation $$\Delta(<a_{co},a_o> \text{ out } <b_{co},b_o>) = (1-b_o)\Delta<a_{co},a_o>.$$

and the colour double differences using this equation $$\Delta\Delta(<a_{co},a_o> \text{ out } <b_{co},b_o>) = <(1-b_o)\Delta\Delta a_{co}, 0>.$$

C.5.3.12 quadratic blend run OUT linear blend run
   Calculate the colour and opacity of each pixel in the resulting pixel run using the OUT equation.
C.5.3.13 quadratic blend run OUT quadratic blend run
   Calculate the colour and opacity of each pixel in the resulting pixel run using the OUT equation.
C.5.3.14 quadratic blend run OUT pixel run
   Calculate the colour and opacity of each pixel in the resulting pixel run using the OUT equation.
C.5.3.15 quadratic blend run OUT transparent run
   Copy the quadratic blend run.
C.5.3.16 pixel run OUT flat run
   Calculate the colour and opacity of each pixel in the resulting pixel run using the OUT equation.
C.5.3.17 pixel run OUT linear blend run
   Calculate the colour and opacity of each pixel in the resulting pixel run using the OUT equation.
C.5.3.18 pixel run OUT quadratic blend run Calculate the colour and opacity of each pixel in the resulting pixel run using the OUT equation.

C.5.3.19 pixel run OUT pixel run

Calculate the colour and opacity of each pixel in the resulting pixel run using the OUT equation.

C.5.3.20 pixel run OUT transparent run

Copy the pixel run.

C.5.3.21 transparent run OUT flat run

Write a transparent run.

C.5.3.22 transparent run OUT linear blend run

Write a transparent run.

C.5.3.23 transparent run OUT quadratic blend run

Write a transparent run.

C.5.3.24 transparent run OUT pixel run

Write a transparent run.

C.5.3.25 transparent run OUT transparent run

Write a transparent run.

C.6 Outline Of The ATOP Operator Processing

C.6.0.26 The compositing operator for the ATOP operator is:

$$<a_{co}, a_o> \text{ atop } <b_{co}, b_o> = <b_o a_{co} + (1-a_o) b_{co}, b_o>.$$

C.6.1 Features Specific To The ATOP Operator

C.6.1.1 It is to be noted that whenever a pair of corresponding runs are both found to be opaque then a copy of the left-hand operand's opaque run can be made in the output without any compositing (see the compositing operator above).

C.6.1.2 Whenever the left-hand operand is transparent, the result is a copy of the other operand.

C.6.1.3 Whenever the right-hand operand is transparent, the result is a transparent run.

C.6.2 Compositing Result Types

C.6.2.1 Table 4 summarises the result of compositing one run A ATOP another run B.

TABLE 4

| A's type/ B's type | flat | linear | quadratic | pixel | transparent |
|---|---|---|---|---|---|
| flat | flat | linear | quadratic | pixel | transparent |
| linear | linear | quadratic | pixel | pixel | transparent |
| quadratic | quadratic | pixel | pixel | pixel | transparent |
| pixel | pixel | pixel | pixel | pixel | transparent |
| transparent | flat | linear | quadratic | pixel | transparent |

C.6.3 Compositing Implementation

C.6.3.1 flat run ATOP flat run

Calculate the colour and opacity of the resulting flat run using the ATOP equation.

C.6.3.2 flat run ATOP linear blend run

Calculate the starting colour and opacity of the resulting linear blend run using the ATOP equation.

Calculate the colour and opacity differences using the following equation $$\Delta(<a_{co}, a_o> \text{ atop } <b_{co}, b_o>) = (1-a_o)\Delta<b_{co}, b_o>.$$

C.6.3.3 flat run ATOP quadratic blend run

Calculate the starting colour and opacity of the resulting quadratic blend run using the ATOP equation.

Calculate the colour and opacity starting differences using the following equation $$\Delta(<a_{co}, a_o> \text{ atop } <b_{co}, b_o>) = (1-a_o)\Delta<b_{co}, b_o>.$$

and the colour double differences using this equation $$\Delta\Delta(<a_{co}, a_o> \text{ atop } <b_{co}, b_o>) = <(1-a_o)\Delta\Delta b_{co}, 0>.$$

C.6.3.4 flat run ATOP pixel run

Calculate the colour and opacity of each pixel in the resulting pixel run using the ATOP equation.

C.6.3.5 flat run ATOP transparent run

Write a transparent run.

C.6.3.6 linear blend run ATOP flat run

Calculate the starting colour and opacity of the resulting linear blend run using the ATOP equation.

Calculate the colour and opacity differences using the following equation $$\Delta(<a_{co}, a_o> \text{ atop } <b_{co}, b_o>) = <b_o\Delta a_{co} - b_{co}\Delta a_o, 0>.$$

C.6.3.7 linear blend run ATOP linear blend run

Calculate the starting colour and opacity of the resulting quadratic blend run using the ATOP equation.

Calculate the colour and opacity starting differences using the following equation $$\Delta(<a_{co}, a_o> \text{ atop } <b_{co}, b_o>) = <(a_{co}+\Delta a_{co})\Delta b_{co} + (1-a_o-\Delta ao)\Delta b_{co} + b_o\Delta a_{co} - b_{co}\Delta a_o, \Delta b_o>.$$

and the colour double differences using this equation $$\Delta\Delta(<a_{co}, a_o> \text{ atop } <b_{co}, b_o>) = <2(\Delta b_o\Delta a_{co} - \Delta a_o\Delta b_{co}), 0>.$$

C.6.3.8 linear blend run ATOP quadratic blend run

Calculate the colour and opacity of each pixel in the resulting pixel run using the ATOP equation.

C.6.3.9 linear blend run ATOP pixel run

Calculate the colour and opacity of each pixel in the resulting pixel run using the ATOP equation.

C.6.3.10 linear blend run ATOP transparent run

Write a transparent run.

C.6.3.11 quadratic blend run ATOP flat run

Calculate the starting colour and opacity of the resulting quadratic blend run using the ATOP equation.

Calculate the colour and opacity starting differences using the following equation $$\Delta(<a_{co}, a_o> \text{atop} <b_{co}, b_o>) = (b_o\Delta a_{co} - b_{co}\Delta a_o, 0>.$$

and the colour double differences using this equation $$\Delta\Delta(<a_{co}, a_o> \text{atop} <b_{co}, b_o>) = <b_o\Delta\Delta a_{co}, 0>.$$

C.6.3.12 quadratic blend run ATOP linear blend run

Calculate the colour and opacity of each pixel in the resulting pixel run using the ATOP equation.

C.6.3.13 quadratic blend run ATOP quadratic blend run

Calculate the colour and opacity of each pixel in the resulting pixel run using the ATOP equation.

C.6.3.14 quadratic blend run ATOP pixel run

Calculate the colour and opacity of each pixel in the resulting pixel run using the ATOP equation.

C.6.3.15 quadratic blend run ATOP transparent run

Copy the quadratic blend run.

C.6.3.16 pixel run ATOP flat run
  Calculate the colour and opacity of each pixel in the resulting pixel run using the ATOP equation.
C.6.3.17 pixel run ATOP linear blend run
  Calculate the colour and opacity of each pixel in the resulting pixel run using the ATOP equation.
C.6.3.18 pixel run ATOP quadratic blend run
  Calculate the colour and opacity of each pixel in the resulting pixel run using the ATOP equation.
C.6.3.19 pixel run ATOP pixel run
  Calculate the colour and opacity of each pixel in the resulting pixel run using the ATOP equation.
C.6.3.20 pixel run ATOP transparent run
  Write a transparent run.
C.6.3.21 transparent run ATOP flat run
  Copy the flat run.
C.6.3.22 transparent run ATOP linear blend run
  Copy the linear blend run.
C.6.3.23 transparent run ATOP quadratic blend run
  Copy the quadratic blend run.
C.6.3.24 transparent run ATOP pixel run
  Copy the pixel run.
C.6.3.25 transparent run ATOP transparent run
  Write a transparent run.
C.7 Outline Of The UPON Operator Processing
C.7.0.26 The compositing operator for the UPON operator is:

$$<a_{co},a_o> \text{upon} <b_{co},b_o>) = <\text{clamp}(b_o a_{co}+b_{co}), \text{clamp}(b_o a_o+b_o)>.$$

C.7.1 Features Specific To The UPON Operator
C.7.1.1 If the composition of two runs that would ordinarily produce a blend run is found to result in saturation anywhere within the boundaries of the blend, then the composition will produce a pixel run.
C.7.1.2 Whenever the left-hand operand is transparent, the result is a copy of the other operand.
C.7.1.3 Whenever the right-hand operand is transparent, the result is a transparent run.
C.7.2 Compositing Result Types
C.7.2.1 Table 5 summarises the result of compositing one run A UPON another run B.

TABLE 5

| A's type/B's type | flat | linear | quadratic | pixel | transparent |
|---|---|---|---|---|---|
| flat | flat | linear | quadratic | pixel | transparent |
| linear | linear | pixel | pixel | pixel | transparent |
| quadratic | quadratic | pixel | pixel | pixel | transparent |
| pixel | pixel | pixel | pixel | pixel | transparent |
| transparent | flat | linear | quadratic | pixel | transparent |

C.7.3 Compositing Implementation
C.7.3.1 flat run UPON flat run
  Calculate the colour and opacity of the resulting flat run using the UPON equation.
C.7.3.2 flat run UPON linear blend run
  Calculate the starting colour and opacity of the resulting linear blend run using the UPON equation.
  Calculate the colour and opacity differences using the following equation $$\Delta(<a_{co},a_o> \text{upon} <b_{co},b_o>) = \Delta b_o <a_{co},a_o> + \Delta <b_{co},b_o>.$$

C.7.3.3 flat run UPON quadratic blend run
  Calculate the starting colour and opacity of the resulting quadratic blend run using the UPON equation.
  Calculate the colour and opacity starting differences using the following equation $$\Delta(<a_{co},a_o> \text{upon} <b_{co},b_o>) = \Delta b_o <a_{co},a_o> + \Delta <b_{co},b_o>.$$

and the colour double differences using this equation $$\Delta\Delta(<a_{co},a_o> \text{upon} <b_{co},b_o>) = <\Delta\Delta b_{co},0>.$$

C.7.3.4 flat run UPON pixel run
  Calculate the colour and opacity of each pixel in the resulting pixel run using the UPON equation.
C.7.3.5 flat run UPON transparent run
  Write a transparent run.
C.7.3.6 linear blend run UPON flat run
  Calculate the starting colour and opacity of the resulting linear blend run using the UPON equation.
  Calculate the colour and opacity differences using the following equation $$\Delta(<a_{co},a_o> \text{upon} <b_{co},b_o>) = b_o \Delta <a_{co},a_o>.$$

C.7.3.7 linear blend run UPON linear blend run
  Calculate the colour and opacity of each pixel in the resulting pixel run using the UPON equation.
C.7.3.8 linear blend run UPON quadratic blend run
  Calculate the colour and opacity of each pixel in the resulting pixel run using the UPON equation.
C.7.3.9 linear blend run UPON pixel run
  Calculate the colour and opacity of each pixel in the resulting pixel run using the UPON equation.
C.7.3.10 linear blend run UPON transparent run
  Write a transparent run.
C.7.3.11 quadratic blend run UPON flat run
  Calculate the starting colour and opacity of the resulting quadratic blend run using the UPON equation.
  Calculate the colour and opacity starting differences using the following equation $$\Delta(<a_{co},a_o> \text{upon} <b_{co},b_o>) = b_o \Delta <a_{co},a_o>.$$

and the colour double differences using this equation $$\Delta\Delta(<a_{co},a_o> \text{upon} <b_{co},b_o>) = <\Delta\Delta a_{co},0>.$$

C.7.3.12 quadratic blend run UPON linear blend run
  Calculate the colour and opacity of each pixel in the resulting pixel run using the UPON equation.
C.7.3.13 quadratic blend run UPON quadratic blend run
  Calculate the colour and opacity of each pixel in the resulting pixel run using the UPON equation.
C.7.3.14 quadratic blend run UPON pixel run
  Calculate the colour and opacity of each pixel in the resulting pixel run using the UPON equation.
C.7.3.15 quadratic blend run UPON transparent run
  Copy the quadratic blend run.
C.7.3.16 pixel run UPON flat run
  Calculate the colour and opacity of each pixel in the resulting pixel run using the UPON equation.
C.7.3.17 pixel run UPON linear blend run
  Calculate the colour and opacity of each pixel in the resulting pixel run using the UPON equation.
C.7.3.18 pixel run UPON quadratic blend run
  Calculate the colour and opacity of each pixel in the resulting pixel run using the UPON equation.

C.7.3.19 pixel run UPON pixel run
  Calculate the colour and opacity of each pixel in the resulting pixel run using the UPON equation.
C.7.3.20 pixel run UPON transparent run
  Write a transparent run.
C.7.3.21 transparent run UPON flat run
  Copy the flat run.
C.7.3.22 transparent run UPON linear blend run
  Copy the linear blend run.
C.7.3.23 transparent run UPON quadratic blend run
  Copy the quadratic blend run.
C.7.3.24 transparent run UPON pixel run
  Copy the pixel run.
C.7.3.25 transparent run UPON transparent run
  Write a transparent run.
C.8 Outline Of The XOR Operator Processing
C.8.0.26 The compositing operator for the XOR operator is:

$$<a_{co},a_o>\text{Xor}<b_{co},b_o>=<(1-b_o)a_{co}+(1-a_o)b_{co},(1-b_o)a_o+(1-a_o)b_o>.$$

C.8.1 Festures Specific To The XOR Operator
C.8.1.1 It is to be noted that whenever a pair of corresponding runs are both found to be opaque then a transparent run can be written.
C.8.1.2 Whenever either operand is transparent, the result is a copy of the other operand.
C.8.2. Compositing Result Types
C.8.2.1 Table 6 summarises the result of compositing one run A XOR another run B.

TABLE 6

| A's type/B's type | flat | linear | quadratic | pixel | transparent |
|---|---|---|---|---|---|
| flat | flat | linear | quadratic | pixel | flat |
| linear | linear | pixel | pixel | pixel | linear |
| quadratic | quadratic | pixel | pixel | pixel | quadratic |
| pixel | pixel | pixel | pixel | pixel | pixel |
| transparent | flat | linear | quadratic | pixel | transparent |

C.8.3 Compositing Implementation
C.8.3.1 flat run XOR flat run
  Calculate the colour and opacity of the resulting flat run using the XOR equation.
C.8.3.2 flat run XOR linear blend run
  Calculate the starting colour and opacity of the resulting linear blend run using the XOR equation.
  Calculate the colour and opacity differences using the following equation $$\Delta(<a_{co},a_o>\text{xor}<b_{co},b_o>)=-\Delta b_o<a_{co},a_o>+(1-a_o)\Delta<b_{co},b_o>.$$

C.8.3.3 flat run XOR quadratic blend run
  Calculate the starting colour and opacity of the resulting quadratic blend run using the XOR equation.
  Calculate the colour and opacity starting differences using the following equation $$\Delta(<a_{co},a_o>\text{xor}<b_{co},b_o>)=-\Delta b_o<a_{co},a_o>+(1-a_o)\Delta<b_{co},b_o>.$$

Calculate the colour and opacity double differences using the following equation $$\Delta(<a_{co},a_o>\text{xor}<b_{co},b_o>)=<(a-a_o)\Delta\Delta b_{co},0>.$$

C.8.3.4 flat run XOR pixel run
  Calculate the colour and opacity of each pixel in the resulting pixel run using the XOR equation.

C.8.3.5 flat run XOR transparent run
  Copy the flat run.
C.8.3.6 linear blend run XOR flat run
  This is equivalent to flat run XOR linear blend run with the operands swapped.
C.8.3.7 linear blend run XOR linear blend run
  Calculate the colour and opacity of each pixel in the resulting pixel run using the XOR equation.
C.8.3.8 linear blend run XOR quadratic blend run
  Calculate the colour and opacity of each pixel in the resulting pixel run using the XOR equation.
C.8.3.9 linear blend run XOR pixel run
  Calculate the colour and opacity of each pixel in the resulting pixel run using the XOR equation.
C.8.3.10 linear blend run XOR transparent run
  Copy the linear blend run.
C.8.3.11 quadratic blend run XOR flat run
  This is equivalent to flat run XOR quadratic blend run with the operands swapped.
C.8.3.12 quadratic blend run XOR linear blend run
  This is equivalent to linear blend run XOR quadratic blend run with the operands swapped.
C.8.3.13 quadratic blend run XOR quadratic blend run
  Calculate the colour and opacity of each pixel in the resulting pixel run using the XOR equation.
C.8.3.14 quadratic blend run XOR pixel run
  Calculate the colour and opacity of each pixel in the resulting pixel run using the XOR equation.
C.8.3.15 quadratic blend run XOR transparent run
  Copy the quadratic blend run.
C.8.3.16 pixel run XOR flat run
  This is equivalent to flat run XOR pixel run with the operands swapped.
C.8.3.17 pixel run XOR linear blend run
  This is equivalent to linear blend run XOR pixel run with the operands swapped.
C.8.3.18 pixel run XOR quadratic blend run
  This is equivalent to flat run XOR quadratic blend run with the operands swapped.
C.8.3.19 pixel run XOR pixel run
  Calculate the starting colour and opacity of each pixel in the resulting pixel run using the XOR equation.
C.8.3.20 pixel run XOR transparent run
  Copy the pixel run.
C.8.3.21 transparent run XOR flat run
  Copy the flat run.
C.8.3.22 transparent run XOR linear blend run
  Copy the linear blend run.
C.8.3.23 transparent run XOR quadratic blend run
  Copy the quadratic blend run.
C.8.3.24 transparent run XOR pixel run
  Copy the pixel run.
C.8.3.25 transparent run XOR transparent run
  Write a transparent run.
C.9 Outline Of The PLUS Operator Processing
C.9.0.26 The compositing operator for the PLUS operator is:

$$<a_{co},a_o>\text{plus}<b_{co},b_o>=<\text{clamp}(a_{co}+b_{co}),\text{clamp}(a_o+b_o)>.$$

C.9.1 Features Specific To The PLUS Operator
C.9.1.1 If the composition of two runs that would ordinarily produce a blend run is found to result in saturation anywhere within the boundaries of the blend, then the composition will produce pixel run.

C.9.1.2 Whenever either operand is transparent, the result is a copy of the other operand.

C.9.2 Compositing Result Types

C.9.2.1 Table 7 summarises the result of compositing one run A PLUS another run B.

TABLE 7

| A's type/ B's type | flat | linear | quadratic | pixel | transparent |
|---|---|---|---|---|---|
| flat | flat | linear | quadratic | pixel | flat |
| linear | linear | linear | quadratic | pixel | linear |
| quadratic | quadratic | quadratic | quadratic | pixel | quadratic |
| pixel | pixel | pixel | pixel | pixel | pixel |
| transparent | flat | linear | quadratic | pixel | transparent |

C.9.3 Compositing Implementation

C.9.3.1 flat run PLUS flat run

Calculate the colour and opacity of the resulting flat run using the PLUS equation.

C.9.3.2 flat run PLUS linear blend run

Calculate the starting colour and opacity of the resulting linear blend run using the PLUS equation.

Calculate the colour and opacity differences using the following equation $$\Delta(<a_{co}, ao>\text{plus}<b_{co}, b_o>) = \Delta<b_{co}, b_o>.$$

C.9.3.3 flat run PLUS quadratic blend run

Calculate the starting colour and opacity of the resulting quadratic blend run using the PLUS equation.

Calculate the colour and opacity starting differences using the following equation $$\Delta(<a_{co}, a_o>\text{plus}<b_{co}, b_o>) = \Delta<b_{co}, b_o>.$$

Calculate the colour and opacity double differences using the following equation $$\Delta(<a_{co}, a_o>\text{plus}<b_{co}, b_o>) = <\Delta\Delta b_{co}, 0>.$$

C.9.3.4 flat run PLUS pixel run

Calculate the colour and opacity of each pixel in the resulting pixel run using the PLUS equation.

C.9.3.5 flat run PLUS transparent run

Copy the flat run.

C.9.3.6 linear blend run PLUS flat run

This is equivalent to flat run PLUS linear blend run with the operands swapped.

C.9.3.7 linear blend run PLUS linear blend run

Calculate the starting colour and opacity of the resulting linear blend run using the PLUS equation.

Calculate the colour and opacity differences using the following equation $$\Delta(<a_{co}, a_o>\text{plus}<b_{co}, b_o>) = \Delta<a_{co}, a_o> + \Delta<b_{co}, b_o>.$$

C.9.3.8 linear blend run PLUS quadratic blend run

Calculate the starting colour and opacity of the resulting quadratic blend runs using the PLUS equation.

Calculate the color and opacity starting differences using the following equation $$\Delta(<a_{co}, a_o>\text{plus}<b_{co}, b_o>) = \Delta<a_{co}, a_o> + \Delta<b_{co}, b_o>.$$

Calculate the colour and opacity double differences using the following equation $$\Delta\Delta(<a_{co}, a_o>\text{plue}<b_{co}, b_o>) = <\Delta\Delta b_{co}, 0>.$$

C.9.3.9 linear blend run PLUS pixel run

Calculate the colour and opacity of each pixel in the resulting pixel run using the PLUS equation.

C.9.3.10 linear blend run PLUS transparent run

Copy the linear blend run.

C.9.3.11 quadratic blend run PLUS flat run

This is equivalent to flat run PLUS quadratic blend run with the operands swapped.

C.9.3.12 quadratic blend run PLUS linear blend run

This is equivalent to linear blend run PLUS quadratic blend run with the operands swapped.

C.9.3.13 quadratic blend run PLUS quadratic blend run

Calculate the starting colour and opacity of the resulting quadratic blend run using the PLUS equation.

Calculate the colour and opacity starting differences using the following equation $$\Delta(<a_{co}, a_o>\text{plus}<b_{co}, b_o>) = \Delta<a_{co}, a_o> + \Delta<b_{co}, b_o>.$$

Calculate the colour and opacity double differences using the following equation $$\Delta\Delta(<a_{co}, a_o>\text{plus}<b_{co}, b_o>) = <\Delta\Delta a_{co} + \Delta\Delta b_{co}, 0>.$$

C.9.3.14 quadratic blend run PLUS pixel run

Calculate the colour and opacity of each pixel in the resulting pixel run using the PLUS equation.

C.9.3.15 quadratic blend run PLUS transparent run

Copy the quadratic blend run.

C.9.3.16 pixel run PLUS flat run

This is equivalent to flat run PLUS pixel run with the operands swapped.

C.9.3.17 pixel run PLUS linear blend run

This is equivalent to linear blend run PLUS pixel run with the operands swapped.

C.9.3.18 pixel run PLUS quadratic blend run

This is equivalent to flat run PLUS quadratic blend run with the operands swapped.

C.9.3.19 pixel run PLUS pixel run

Calculate the colour and opacity of each pixel in the resulting pixel run using the PLUS equation.

C.9.3.20 pixel run PLUS transparent run

Copy the pixel run.

C.9.3.21 transparent run PLUS flat run

Copy the flat run.

C.9.3.22 transparent run PLUS linear blend run

Copy the linear blend run.

C.9.3.23 transparent run PLUS quadratic blend run

Copy the quadratic blend run.

C.9.3.24 transparent run PLUS pixel run

Copy the pixel run.

C.9.3.25 transparent run PLUS transparent run

Write a transparent run.

C.10 Outline Of The AND Operator Processing

C.10.0.26 The compositing operator for the AND operator is:

$$<a_{co}, a_o>\text{and}<b_{co}, b_o>) = <\text{clamp}(b_o a_{co} + a_o b_{co}), \text{clamp}(2a_o b_o)>.$$

C.10.1 Features Specific To The AND Operator

C.10.1.1 If the composition of two runs that would ordinarily produce a blend run is found to result in saturation anywhere within the boundaries of the blend, then the composition will produce a pixel run.

C.10.1.2 Whenever either operand is transparent, the result is a transparent run.

C.10.2 Compositing Result Types

C.10.2.1 Table 8 summarises the result of compositing one run A AND another run B.

TABLE 8

| A's type/B's type | flat | linear | quadratic | pixel | transparent |
|---|---|---|---|---|---|
| flat | flat | linear | quadratic | pixel | transparent |
| linear | linear | pixel | pixel | pixel | transparent |
| quadratic | quadratic | pixel | pixel | pixel | transparent |
| pixel | pixel | pixel | pixel | pixel | transparent |
| transparent | transparent | transparent | transparent | transparent | transparent |

C.10.3 Compositing Implementation

C.10.3.1 flat run AND flat run

Calculate the colour and opacity of the resulting flat run using the AND equation.

C.10.3.2 flat run AND linear blend run

Calculate the starting colour and opacity of the resulting linear blend run using the AND equation.

Calculate the colour and opacity differences using the following equation $$\Delta(<a_{co},a_o>\text{and}<b_{co},b_o>)=<a_{co}\Delta b_o+a_o\Delta b_{co},2c_o\Delta b_o>.$$

C.10.3.3 flat run AND quadratic blend run

Calculate the starting colour and opacity of the resulting quadratic blend run using the AND equation.

Calculate the colour and opacity starting differences using the following equation $$\Delta(<a_{co},a_o>\text{and}<b_{co},b_o>)=<a_{co}\Delta b_o+a_o\Delta b_{co},2c_o\Delta b_o>.$$

Calculate the colour and opacity double differences using the following equation $$\Delta(<a_{co},a_o>\text{and}<b_{co},b_o>)=<a_{co}\Delta\Delta b_{co},0>$$

C.10.3.4 flat run AND pixel run

Calculate the colour and opacity of each pixel in the resulting pixel run using the AND equation.

C.10.3.5 flat run AND transparent run

Write a transparent run.

C.10.3.6 linear blend run AND flat run

This is equivalent to flat run AND linear blend run with the operands swapped.

C.10.3.7 linear blend run AND linear blend run

Calculate the colour and opacity of each pixel in the resulting pixel run using the AND equation.

C.10.3.8 linear blend run AND quadratic blend run

Calculate the colour and opacity of each pixel in the resulting pixel run using the AND equation.

C.10.3.9 linear blend run AND pixel run

Calculate the colour and opacity of each pixel in the resulting pixel run using the AND equation.

C.10.3.10 linear blend run AND transparent run

Write a transparent run.

C.10.3.11 quadratic blend run AND flat run

This is equivalent to flat run AND quadratic blend run with the operands swapped.

C.10.3.12 quadratic blend run AND linear blend run

This is equivalent to linear blend run AND quadratic blend run with the operands swapped.

C.10.3.13 quadratic blend run AND quadratic blend run

Calculate the colour and opacity of each pixel in the resulting pixel run using the AND equation.

C.10.3.14 quadratic blend run AND pixel run

Calculate the colour and opacity of each pixel in the resulting pixel run using the AND equation.

C.10.3.15 quadratic blend run AND transparent run

Write a transparent run.

C.10.3.16 pixel run AND flat run

This is equivalent to flat run AND pixel run with the operands swapped.

C.10.3.17 pixel run AND linear blend run

This is equivalent to linear blend run AND pixel run with the operands swapped.

C.10.3.18 pixel run AND quadratic blend run

This is equivalent to flat run AND quadratic blend run with the operands swapped.

C.10.3.19 pixel run AND pixel run

Calculate the colour and opacity of each pixel in the resulting pixel run using the AND equation.

C.10.3.20 pixel run AND transparent run

Write a transparent run.

C.10.3.21 transparent run AND flat run

Write a transparent run.

C.10.3.22 transparent run AND linear blend run

Write a transparent run.

C.10.3.23 transparent run AND quadratic blend run

Write a transparent run.

C.10.3.24 transparent run AND pixel run

Write a transparent run.

C.10.3.25 transparent run AND transparent run

Write a transparent run.

D. Processing

In the functions described in the Appendices, an assumption is made that it is necessary to create a new run-length encoded image for each intersection of two images, It is quite possible to use the same techniques when editing an existing run-length encoded image to add more composited data.

(i) Determining Colour And Opacity At Any Offset Within A Blend

In the description below, the colour and opacity values at any offset within a linear blend, and the colour, opacity and colour single difference values at any offset within a quadratic blend, are sometimes required prior to compositing. The methods for obtaining these values are described immediately below.

Linear Blends

Add the colour difference values multiplied by the offset into the run to the run's start colours and similarly add the opacity difference multiplied by the offset to the start opacity.

Quadratic Blends

The colours are determined by the formula:

$$C = Cs + (n*D) + ((n*(N-1))*DD)/2$$

where C is the required colour, Cs is the start colour, n is the offset into the run, D is the single difference and DD is the double difference between adjacent pixels. The required opacity is merely the run's start opacity plus n multiplied by the opacity single difference (opacity double difference is zero).

The single colour difference values are determined by adding the double difference values times the offset into the run to the run's start colour single difference values. Note that the opacity difference value is a constant.

Higher Order Polynomial Blends

If higher than quadratic colour or higher than linear opacity are required, it is straightforward to derive formulae for the value at any point inside a blend run based on the appropriate differences.

E. Compositing of Two Runs

Figure 1:
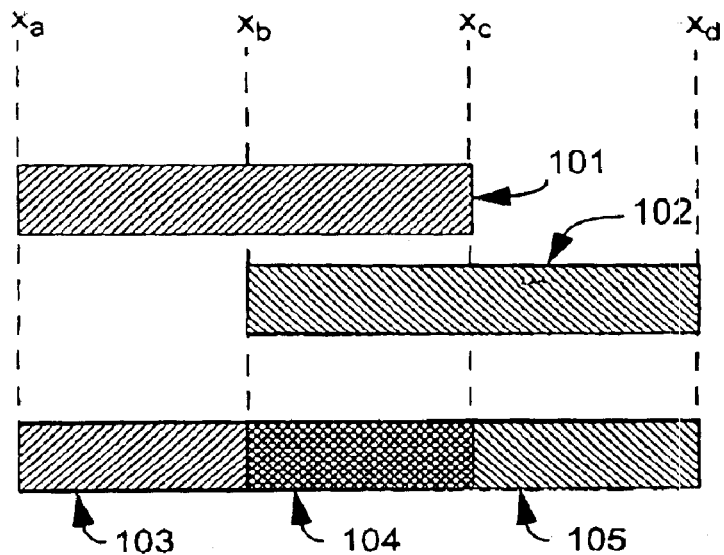
FIG. 1 represents the composition of two runs, one from the left-hand operand of a compositing operator and one from the right-hand operand of a compositing operator.
Figure 2:
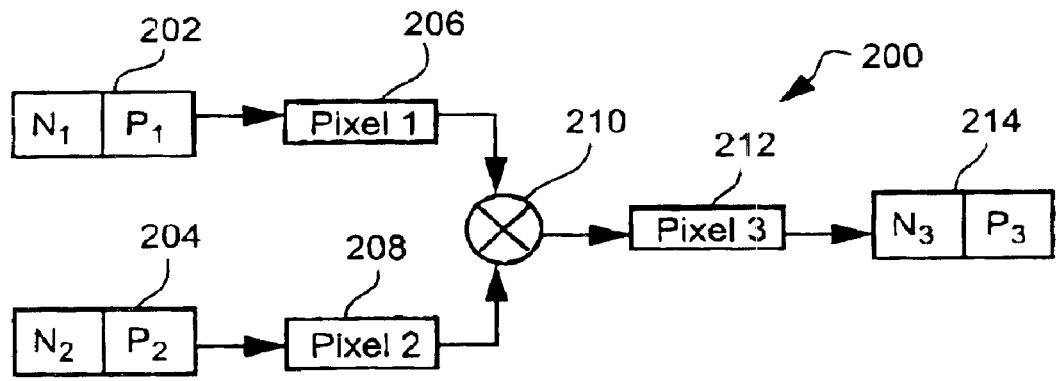
FIG. 2 depicts a prior art run-based compositing operation.

The basic unit of compositing in the run-based compositing tool is the run. Where two runs intersect, one from the left-hand operand of a compositing operator, and the other from the right-hand operand, those two runs can be combined to form a third run. The actual parameters which define the third run depend upon the types of the runs being combined and the compositing operator being used. FIG. 1 represents the compositing together of two runs 101 and 102. Run 101 is the run from the left-hand operand and is active between pixel locations $x_b$ and $x_c$ on a scanline. Run 102 is the run from the right-hand operand and is active between pixel locations $x_b$ and $x_d$ on the same scanline. Runs 103, 104 and 105 represent the three runs of the result of the composition in which run 104 between $x_b$ and $x_c$ represents the area of intersection of the input runs 101 and 102. In the immediately following paragraphs several examples of compositing two runs are given.

Flat Colour and Opacity OVER Quadratic Colour and Linear Opacity Blend

The first example uses the OVER operator. The input runs are:

(a) Run 101 is a flat colour and opacity, and
(b) Run 102 is a quadratic blend.

The three runs in result are as follows:

(c) Run 103 is a flat colour and opacity run. Same start coordinate, colour and opacity as run 101 from the left operand but the run length is reduced to the distance between the start coordinate and the start point of the intersection of the two runs.

(d) Run 104 is a quadratic blend run. The start colour and opacity of new run 104 are determined by compositing the colour and opacity of run 101 OVER the start colour and opacity of the run 102 using the OVER compositing operator described above. The initial colour difference, colour double difference and opacity difference of the new run 104 are those of run 102 multiplied by one minus the opacity of flat run 102. The start coordinate is the start point of the intersection of the two runs and the run length is the length of the intersection of the two runs.

(e) Run 105 is a quadratic blend run. It is the same blend as run 102 but has different start colours and opacity and different start colour differences and opacity difference (the colour double differences are the same as run 102). The start colours and opacity and the start colour differences are determined as described above. The opacity difference and the colour double differences are the same as for run 102. The start coordinate is the end point of the intersection between the two runs. The run length is distance between the new start coordinate and the end of the run 102.

Linear Blend OVER Flat Colour and Opacity

This example uses the OVER operator. The input runs are:

(a) Run 101 is a linear blend; and
(b) Run 102 is a flat colour and opacity.

The three runs in result are as follows:

(c) Run 103 is a linear blend run. Same start coordinate, start colour and opacity and colour and opacity differences as run 101 but the run length is reduced to the distance between the start coordinate and the start point of the intersection of the two runs.

(d) Run 104 is a linear blend run. The colour and opacity of run 101 at the start point of the intersection is determined as described in a previous section above. The start colour and opacity of the new run are determined by compositing the determined colour and opacity of run 101 OVER the colour and opacity of run 102 using the OVER compositing operator described above. Each colour difference of the new run is the colour difference from run 101 minus the product of the opacity difference from run 101 and the corresponding colour from run 102. The opacity difference is opacity difference of run 101 multiplied by (one minus the opacity of run 102). The start coordinate is the start point of the intersection of the two runs and the run length is the length of the intersection of the two runs.

(e) Run 105 is a flat colour and opacity run. The start coordinate is the end point of the intersection between the two runs. The colour and opacity are the same as the colour and opacity of run 102. The run length is distance between the new start coordinate and the end of the run 102.

Quadratic Blend OVER Quadratic Blend

This example uses the OVER operator. The input runs are:

(a) Run 101 is a quadratic blend; and
(b) Run 102 is a quadratic blend.

Note that in this case the run-based compositing tool creates a pixel run for the intersection (run 104). Although it is possible to produce a cubic blend run for run 104, the tool has been configured to produce pixel runs for anything higher than quadratic degree in order to reduce the number of run types which may composited together and hence simplify processing. The three runs in result are as follows:

(c) Run 103 is a quadratic blend run. Same start coordinate, start colour and opacity, start colour differences and opacity difference and start colour double differences as run 101, but the run length is reduced to the distance between the start coordinate and the start point of the intersection of the two runs.

(d) Run 104 is a pixel run. The colour and opacity and the colour and opacity differences of run 101 at the start point of the intersection are determined as described above. The start coordinate is the start point of the intersection of the two runs and the run length is the length of the intersection of the two runs. The colour and opacity of each pixel from both run 101 and 102 are determined for each position within the intersection run length and composited together using the OVER compositing operator to form the output pixels.

(e) Run 105 is a quadratic blend run. It is the same blend as run 102 but has different start colours and opacity and different start colour differences and opacity difference (the colour double differences are the same as run 102). The start colours and opacity and the start colour differences are determined as described above. The opacity difference and the colour double differences are the same as for run 102. The start coordinate is the end point of the intersection between the two runs. The run length is distance between the new start coordinate and the end of the run 102.

Linear Blend IN Flat Colour and Opacity

This example uses the IN operator. The input runs are:

(a) Run 101 is a linear blend; and (b) Run 102 is a flat colour and opacity.

The three runs in result are as follows:

(c) Run 103 is a transparent run. Same start coordinate as the run 101 but the run length is reduced to the distance between the start coordinate and the start point of the intersection of the two runs.

(d) Run 104 is a linear blend run. The colour and opacity of run 101 at the start point of the intersection are determined as described above. The start colour and opacity of the new run are determined by compositing the determined colour and opacity of tun 101 IN the opacity of run 102 using the IN compositing operator described above. Note that when using the IN operator only the opacity channel of run 102 is used, the colour of run 102 (i.e. the right operand) not appearing on the right-hand side of the compositing operator. Each colour difference of the new run is the colour difference from run 101 multiplied by the opacity of run 102. The opacity difference is the opacity difference of run 101 multiplied by the opacity of the right operand. The start coordinate is the start point of the intersection of the two runs and the run length is the length of the intersection of the two runs.

(e) Run 105 is a transparent run. The start coordinate is the end point of the intersection between the two runs. The run length is distance between the new start coordinate and the end of the run 102.

Compositing of Two Run-length Encoded Images

Run-length encoded images comprise one or more scan lines, each scan line comprising one or more runs. The compositing together of two run-length encoded images involves examining the scan lines in which the two images intersect. On any particular such scan line, instead of a single intersection between two runs there may be many intersections between pairs of runs.

F. Configuration

Part C provides a detailed explanation of the various compositing operations and how they are applied to various data types in the run-based compositing tool. The operations are described with reference to tables that identify the type of output run resulting from the operand's run's. FIG. 8 illustrates the method steps applied in the writing of a run as described in those tables, being Tables 1 to 8.

The pseudocode of Appendix A relates to the specific example of compositing using the OVER operator in the run-based compositing tool. Implementation of other compositing operations may be performed in a similar fashion, for example using the IN operator as shown in FIGS. 4, 5, 6 and 7.

Figure 4:
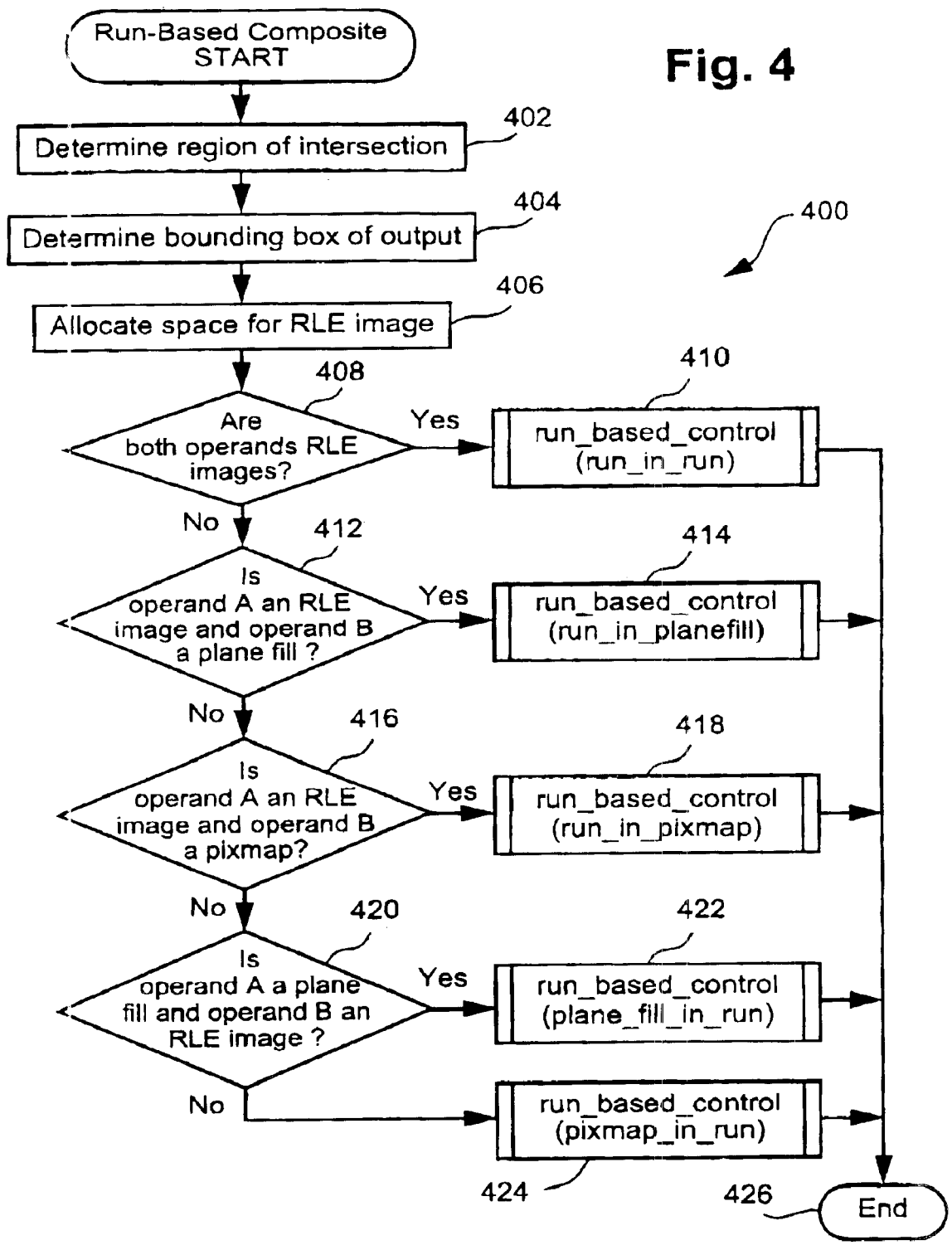
FIG. 4 is a flow chart of the method of operation of the run-based compositing tool for the IN operator.

FIG. 4 shows a run_based_composite operation 400 which commences at step 402 where the routine calls input parameters comprising Operand A, Operand B and the desired Compositing Operator (IN in this case). Initially the method 400 determines the region of intersection of Operand A and Operand B in step 402. This region is typically not a simple rectangle since the operands are often graphical objects of variable shape. From the intersection, the method 400 at step 404 determines a bounding box of the region of intersection, thereby establishing a region in which a run-based result can be determined. At step 406, data space for a run-length encoded image structure (proxy) is allocated with the same number of scan lines as the determined bounding box. Each run list is initialised for each scan line of the structure to indicate the line is empty.

The method 400 is then able to examine each input image type to determine the manner in which to handle the desired compositing operation.

If step 408 determines that Operand A is run-based and Operand B is run-based then step 410 calls a subroutine run_based_control 500 (see FIG. 5) passing, in this example run_in_run as the compositing function.

If step 412 determines that Operand A is run-based and Operand B a plane fill then step 414 calls run_based_control 500 passing run_in_plane_fill as the compositing function.

If step 416 determines that Operand A is run-based and Operand B is a pixmap then step 418 calls run_based_control 500 passing run_over_pixmap as the compositing function.

If step 420 determines that Operand A is a plane fill and Operand B run-based then step 422 calls run_based_control 500 passing plane_fill_in_run as the compositing function.

Otherwise, if Operand A is a pixmap and Operand B is run-based then step 424 calls run_based_control 500 passing pixmap_in_run as the compositing function.

The method 400 returns a pointer to run-length encoded image structure containing the composited data and ends at 426. This structure is also known as a proxy.

Figure 5:
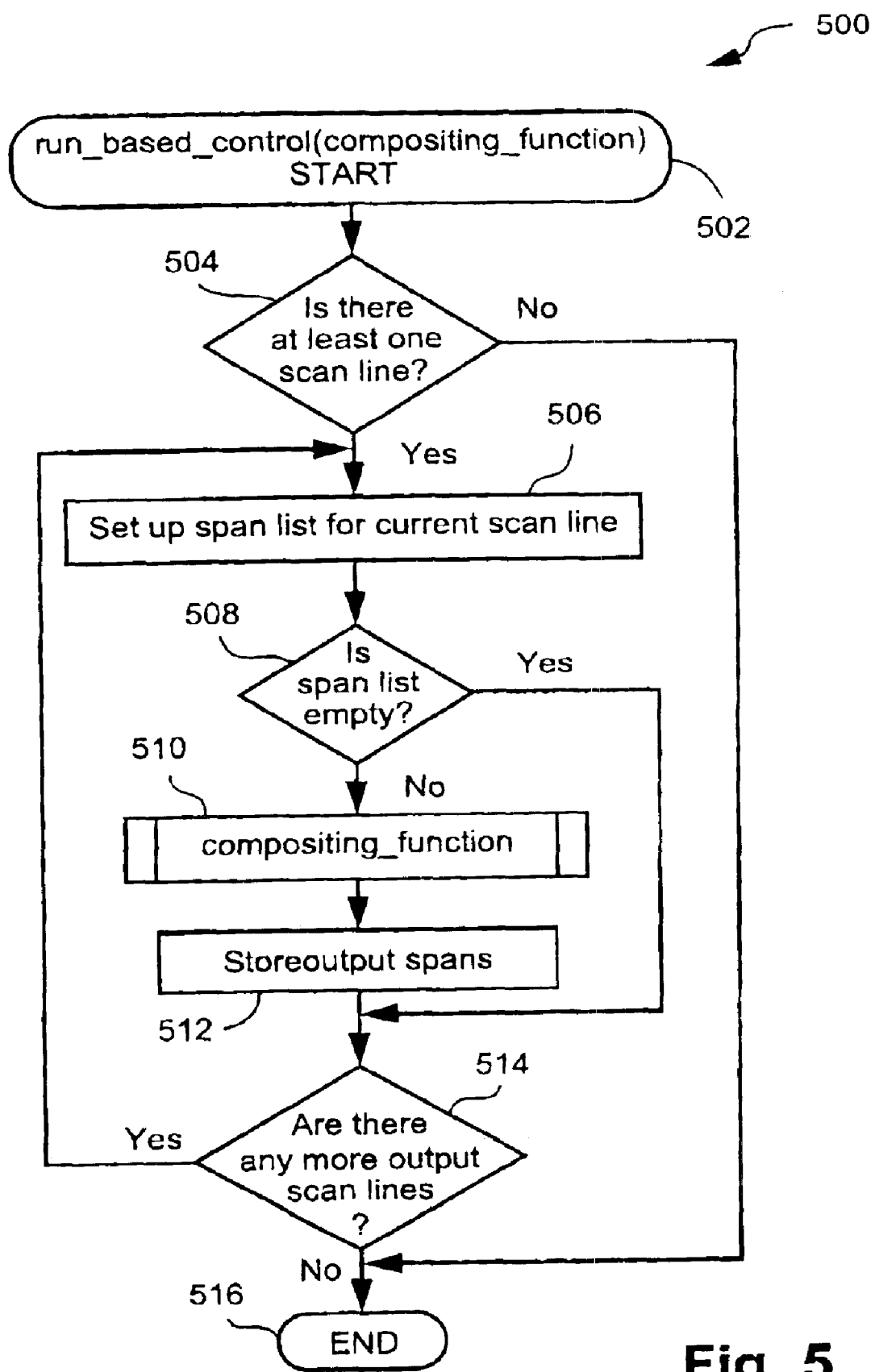
FIG. 5 is a flowchart of the run_based_control subroutine of FIG. 4 represented for an arbitrary compositing function.

Subroutine run_based_control 500 is seen in FIG. 5 and is called using the parameters Operand A, Operand B, the compositing function, the region of intersection, and the result proxy, these being provided at invocation 502 of the subroutine. Step 504 tests initially if there is at least one scan line in the region of intersection. Where such is not the case, control passes to subroutine termination 516.

Where such scan lines exist, step 506 analyses the region of intersection of Operand A and Operand B to establish a linked list of spans (preferably in ascending X coordinate order), with each span comprising a start X coordinate and a length in pixels, a span being a sequence of runs that represents a contiguous run of pixels. It is frequently encountered in compositing operations that a scan line will consist of a single span.

Step 508 then determines if the linked list of spans is empty. If so, control passes to step 514. If not, step 510 calls the given compositing function to set up a scan line of runs passing the list of spans. Step 512 stores the number of spans for the scan line in the proxy.

Figure 6:
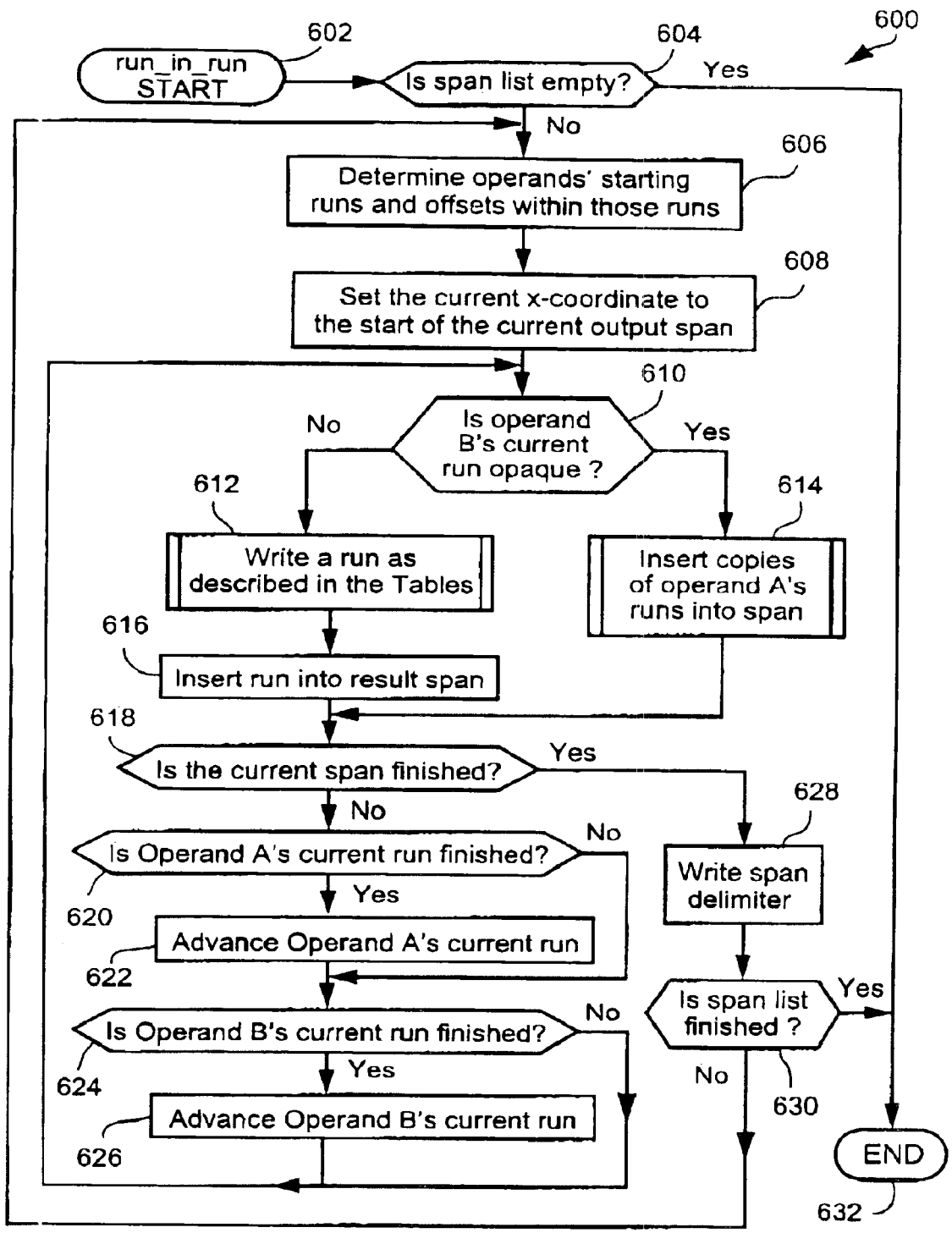
FIG. 6 is a flowchart of the run_in_run subroutine 410 of FIG. 4.

FIG. 6 shows a subroutine 600 for the general handling of a call to a compositing function, in this case being specified as run_in_run at the start point 602. Step 604 implements an initial test to determine if the span list is empty. If so, then the subroutine ends at step 632. Otherwise, step 606 then determines the offsets with the span for each operand consistent with the above description of the x-coordinates seen in FIG. 1. At step 608, the current x-coordinate is set to establish the start of the output span (ie. the span of intersection).

Steps 610 and 614 are specific to the IN compositing function, with step 610 checking if operand B is opaque. If so, at step 614, the IN operation is optimised to simply insert copies of operand A's run into the span (see FIG. 7). That step is performed on the run-based encoded data without a need to decode, perform a pixel-by-pixel composite, and re-encode.

Otherwise, as seen in step 612, the run is written according to the Tables of Part C, and as depicted in FIG. 8, to give the composited run, which is written into the result span in step 616.

Step 618 determines if the current span is finished, and if so, at step 628 writes a span delimiter to maintain track of the completed portion of the composited image. If the span list is finished, as determined at step 630, the method 600 ends. If not, control returns to step 606 for the processing of the next span in the list.

If the span is not finished at step 618, the steps that follow examine each of the operands. Step 620 checks Operand A to determine if it's run is finished and, if so, step 622 advances it's current run. Steps 624 and 626 respectively perform the same checks on Operand B. Control is returned to step 610 for processing the remaining runs.

In FIG. 8, it will be apparent that compositing operations in the run-based compositing tool that apply to a pixel image input component, ultimately resolve to compositing on a pixel-by-pixel basis consistent with traditional methodologies. However, and significantly, specific input types (eg. flat/linear, flat/quadratic), which are commonly encountered in graphics systems, are accommodated without a need to resort to pixel level decoding and processing. Further, so that the run-based compositing tool is practically useful, the compositing of blend types of certain orders (eg. linear/linear, linear/quadratic, etc.) is implemented in the run-based compositing tool on a pixel-by-pixel basis so as to avoid a plethora of cases in subroutines like the ones shown in FIG. 8. In this regard, the present inventors chose to limit the specific implementation of the run-based compositing tool to an order having quadratic colour and linear opacity. Where desired however, the processing order may be extended as desired. For example, some users may find a specific need for quadratic colour and quadratic opacity, in which case a compositing of linear/linear types may be accommodated without a need to decode to a pixel data level. Other, higher orders, may also be accommodated noting that the number of alternatives to be accommodated increases with the square of the order.

Figure 7:
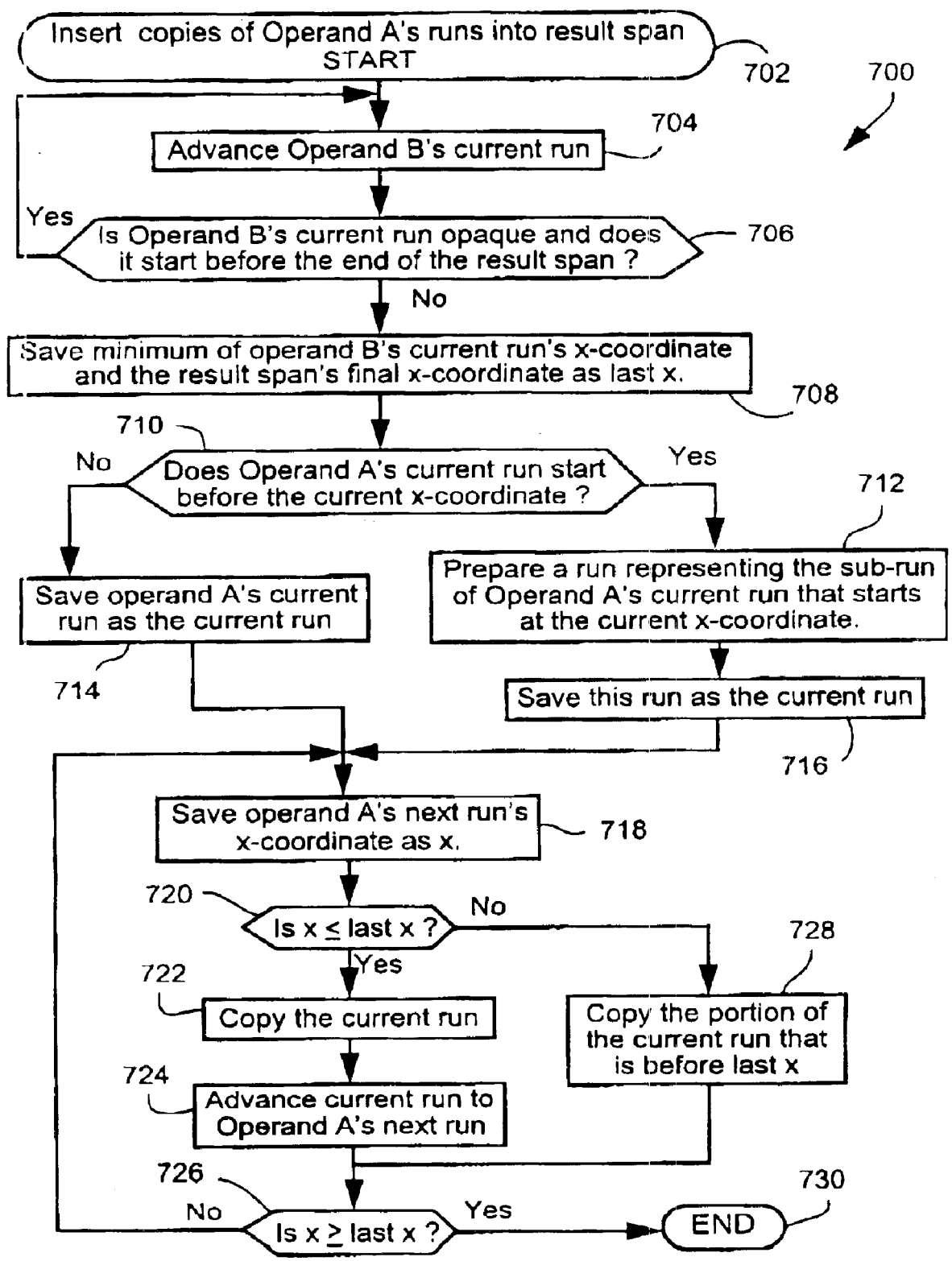
FIG. 7 is a flowchart of the insertion of the runs of operand A into the result span thereby providing for the correct placement of the output composited intersecting run with the balance of the input runs, such as seen in FIG. 1.

FIG. 7 shows a subroutine 700 that is called by step 614 of FIG. 6 and which inserts, in this case, copies of Operand A's runs into the span. Step 702 advances Operand B's run and step 706 performs a check to determine if Operand B's run does not change before the end of the current span. If so, control returns to step 706. If step 706 determines that the end of a sequence of opaque run in Operand B has been reached, step 708 saves a value last x, being a minimum of Operand B's current run x-coordinate and the result span's final x-coordinate. Step 710 determines if Operand A's current run starts before the current x-coordinate. If not, Operand A's current run is saved as the current run in step 714. Otherwise, step 712 prepares a run representing the sub-run of Operand A's current run that starts at the current x-coordinate. Step 716 then save the prepared run as the current run.

Step 718 follows each of steps 714 and 716 and saves Operand A's next run's x-coordinate as x. Step 720 then checks if x≦last x, and if so, step 722 copies the current run and step 724 advances to the next run. If not, step 728 copies that portion of the current run that is before last x. Step 726 then checks if x≧last x and, if so, the subroutine ends at step 730, or else control is returned to step 718.

INDUSTRIAL APPLICABILITY

It will be apparent from the foregoing that a run-based compositing tool is described that is configured to optimise the compositing of run-based data, particularly when described using a distinct alpha (transparency) channel, through avoiding the need to decompress run-length data and composite at a pixel data level, for many compositing operations that would otherwise require such a traditional approach. The run-based compositing tool which incorporates a preferred embodiment of the present invention find application in computer graphics systems such as those used for desk top publishing and the rendering of animations, particularly where speed optimisation is highly desired.

The forgoing describes only one embodiment of the present invention and modifications may be made thereto without departing from the spirit and scope of the present invention.

APPENDIX A

Example of the Computational Steps for the OVER Operation

The following pseudocode is a detailed description of how to composite Operand A OVER Operand B in their area of intersection. The description covers the cases where at least one of Operand A and Operand B is a run-based image and the other is a run-based image, a pixel-based image or a plane fill image.

run_based_composite
  Parameters;
    Operand A
    Operand B
    Compositing Operator (OVER in this case)
  Returns:
    Pointer to run-length encoded image structure containing the composited data. This structure is also known as a proxy.
  BEGIN run_based_composite
    Determine in the region of intersection of Operand A and Operand B. NOTE that this region may not be a simple rectangle.
    Determine the bounding box of the region of intersection.
    Allocate data space for a run-length encoded image structure (proxy) with the same number of scan lines as the determined bounding box, initialise each run list for each scan line of the structure to indicate the line is empty.
    IF Operand A is run-based and Operand B is run-based
    THEN
      Call run_based_control passing run_over_run as the compositing function.
    ELSE IF Operand A is run-based and Operand B a plane fill
    THEN
      Call run_based_control passing run_over_plane_fill as the composition function.
    ELSE IF Operand A is run-based and Operand B is a pixmap
    THEN
      Call run_based_control passing run_over_pixmap as the compositing function.
    ELSE IF Operand A is a plane fill and Operand B run-based
    THEN
      Call run_based_control passing plane_fill_over_run as the compositing function.

```
    ELSE IF Operand A is a pixmap and Operand B is
        run-based
    THEN
        Call run_based_control passing pixmap_over_run
            as the compositing function.
    ENDIF
END run_based_composite
run_based_control
    Parameters:
        Operand A
        Operand B
        Compositing function
        Region of intersection
        Result proxy
    BEGIN run_based_control
        DO FOR each scan line of the region of intersection
            Analyse the region of intersection of Operand A and
                Operand B and set up a linked list of spans (in
                ascending X coordinate order) each span consist-
                ing of a start X coordinate and a length in pixels.
                NOTE that a span is a contiguous run of pixels.
                Frequently a scan line will consist of a single span.
            IF the linked list of spans is not empty
            THEN
                Call given compositing function to set up a scan line
                    of runs passing the list of spans.
                Store the number of spans for the scan line in the
                    proxy.
            ENDIF
        ENDDO
    END run_based_control
run_over_run
    Parameters:
        Operand A
        Operand B
        Result Proxy
        Scan line number
        Linked list of the required spans
    BEGIN run_over_run
        Locate the head of the list of runs within the result
            proxy for the given scan line number.
        FOR each span in the linked list
        DO
            Locate the current scan line in Operand A.
            Locate the run and offset within that run for operand
                A at which this span starts.
            Locate the current scan line in Operand B.
            Locate the run and offset within that run for operand
                B at which this span starts.
            Set the current X position to the start of the required
                span.
            DO UNTIL span is completed
            IF run from Operand A is opaque
            THEN
                Determine the length of the new run as minimum of the
                    remaining span length and the remaining length of
                    the run from operand A from the current X position.
                CASENTRY operand A run type
                    CASE flat colour
                        Write a flat colour run of the same colour as the run
                            from operand A and with the determined length.
                    CASE pixel run
                        Determine the address within the operand A pixel
                            data equivalent to the current X position.
                        Allocate space for a run of pixels of the determined
                            length.
                        Write a pixel run copying the required number of
                            pixels from the determined address.
                    CASE linear colour or opacity blend
                        Determine the blend colour and opacity values for
                            the current X position.
                        Write a linear blend run using the determined start
                            colour and opacity and operand A's colour and
                            opacity differences.
                    CASE quadratic blend
                        Determine the blend colour and opacity values for
                            the current X position.
                        Determine the single difference values for the colour
                            channels for the current X position.
                        Write a quadratic blend run using the determined
                            start colours, start opacity, start single colour
                            differences and using operand A's double differ-
                            ences.
                ENDCASE I
                nsert new run in next position in new span.
                IF the span is not completed.
                THEN
                    Advance the current X position to operand A's next run
                        at offset zero.
                    Advance to the corresponding run and offset for oper-
                        and B.
                    Advance the current X position.
                ENDIF
            ELSE
                NOTE that within this ELSE clause the run from Operand
                    A is deemed to be not opaque.
                Determine the end of the new run as the minimum of
                    the end of the run from operand A, the end of the run
                    from operand B, the end of the span.
                Determine the length of the new run to be written from
                    the current X position and the determined end posi-
                    tion.
                CASENTRY Operand A over Operand B
                    CASE flat colour over flat colour
                        Determine the composite flat colour and opacity
                            using the OVER compositing operator.
                        Write a flat colour run using the determined colour
                            and opacity.
                    CASE flat colour over linear blend
                        Calculate B's current run's offset.
                        Determine B's blend colour and opacity values for
                            the current X position.
                        Using the determined start colour and the flat colour
                            set up the parameters for the new linear blend. The
                            colour and opacity channels being:
                            channel A+(1-opacity A)* channel B
                        The colour and opacity differences being:
                            (1-opacity A)* difference B
                        Write a linear blend run using the determined start
                            colour and opacity and the determined colour and
                            opacity differences.
                    CASE flat colour over quadratic blend
                        Calculate B's current run's offset.
                        Determine B's blend colour and opacity values for
                            the current X position.
                        Determine B's single difference values for the colour
                            channels for the current X position.
                        Using B's determined start colour, determined single
                            differences and constant double differences
                            together with A's flat colour and opacity values set
                            up the parameters for the new quadratic blend. The
                            colour and opacity channels being:
``` channel A+(1-opacity A)* channel B
The colour and opacity differences being:
  (1-opacity A)* difference B
The colour and opacity double differences being:
  (1-opacity A)* double difference B
Write a quadratic blend run using the determined start colours, start opacity, start single colour differences and determined double differences.
CASE flat colour over pixel run
Calculate B's current run's offset.
Determine the start of the pixel data using the run offset into Operand B.
Allocate space for a run of pixels of the determined length.
Composite the flat color with each pixel in B's data from the determined offset using the OVER compositing operator.
Write a pixel run for the newly composited pixels.
CASE linear blend over flat colour
Calculate A's current run's offset.
Determine A's blend colour and opacity values for the current X position.
Using the determined start colour and the flat colour set up the parameters for the new linear blend. The colour and opacity channels being:
  channel A+(1-opacity A)* channel B
The colour differences being:
  colour difference A- (opacity difference A* colour B)
The opacity differences being:
  opacity difference A- (opacity difference A* opacity B)
Write a linear blend run using the determined start colour and opacity and the determined colour and opacity differences.
CASE linear blend over linear blend
NOTE that in this case if A's opacity is a constant a linear blend run could be produced. Also if B's opacity is a constant a quadratic run could be produced. These optimisations are not shown in the pseudo code below.
Calculate A's current run's offset.
Determine A's blend colour and opacity values for the current X position.
Calculate B's current run's offset.
Determine B's blend colour and opacity values for the current X position.
Allocate space for a run of pixels of the determined length.
Determine the colour and opacity values for both operand A and B at each pixel position within the determined run length and composite them using the compositing operator for the OVER operator.
Write a pixel run for the newly composited pixels.
CASE linear blend over quadratic blend
NOTE that in this case if A's opacity is a constant a quadratic blend run could be produced. This optimisation is not shown in the pseudo code below.
Calculate A's current run's offset.
Determine A's blend colour and opacity values for the current X position.
Calculate B's current run's offset.
Determine B's blend colour and opacity values for the current X position.
Determine B's single difference values for the colour channels for the current X position.
Allocate space for a run of pixels of the determined length.
Determine the colour and opacity values for both operand A and B at each pixel position within the determined run length and composite them using the compositing operator for the OVER operator.
Write a pixel run for the newly composited pixels.
CASE linear blend over pixel run
Calculate A's current run's offset.
Determine A's blend colour and opacity values for the current X position.
Calculate B's current run's offset.
Determine the start of the pixel data using the run offset into Operand B.
Allocate data space for the determined run length of pixels.
Determine the colour and opacity values for operand A at each pixel position within the determined run length and composite with operand B's pixel data using the compositing operator for the OVER operator.
Write a pixel run for the newly composited pixels.
CASE quadratic blend over flat colour
Calculate A's current run's offset.
Determine A's blend colour and opacity values for the current X position.
Determine A's single difference values for the colour channels for the current X position.
Using the determined start colour and capacity and the determined start single differences and the flat colour set up the parameters for the new linear blend. The colour and opacity channels being:
  channel A+(1-opacity A)* channel B
The colour differences being:
  colour difference A- (opacity difference A* colour B)
The opacity differences being:
  opacity difference A- (opacity difference A* opacity B)
The double differences being copies of
A's double differences.
Write a quadratic blend run using the determined start colours, start opacity, start single colour differences and A's double differences.
CASE quadratic blend over linear blend
NOTE that in this case if B's opacity is a constant a quadratic blend run could be produced. This optimisation is not shown in the pseudo code below.
Calculate A's current run's offset.
Determine A's blend colour and opacity values for the current X position.
Determine A's single difference values for the colour channels for the current X position.
Calculate B's current run's offset.
Determine B's blend and opacity values for the current X position.
Allocate space for a run of pixels of the determined length.
Determine the colour and opacity values for both operand A and B at each pixel position within the determined run length and composite them using the compositing operator for the OVER operator.
Write a pixel run for the newly composited pixels.
CASE quadratic blend over quadratic blend
Calculate A's current run's offset.
Determine A's blend colour and opacity values for the current X position.
Determine A's single difference values for the colour channels for the current X position.
Calculate B's current run's offset.

Determine B's blend colour and opacity values for the current X position.
Determine B's single difference values for the colour channels for the current X position.
Allocate space for a run of pixels of the determined length.
Determine the colour and opacity values for both operand A and B at each pixel position within the determined run length and composite them using the compositing operator for the OVER operator.
Write a pixel run for the newly composited pixels.
CASE quadratic blend over pixel run
Calculate A's current run's offset.
Determine A's blend colour and opacity values for the current X position.
Determine A's single difference values for the colour channels for the current X position.
Calculate B's current run's offset.
Determine the start of the pixel data using the run offset into Operand B.
Allocate space for a run of pixels of the determined length.
Determine the colour and opacity values for operand A at each pixel position within the determined run length and composite with operand B's pixel data using the compositing operator for the OVER operator.
Write a pixel run for the newly composited pixels.
CASE pixel run over flat colour
Calculate A's current run's offset.
Determine the start of the pixel data using the run offset into Operand A.
Allocate space for a run of pixels of the determined length.
Composite each pixel in A's data from the determined offset with the flat colour using the OVER compositing operator.
Write a pixel run for the newly composited pixels.
CASE pixel run over linear blend
Calculate A's current run's offset.
Determine the start of the pixel data using the run offset into Operand A.
Calculate B's current run's offset.
Determine B's blend colour and opacity values for the current X position.
Allocate space for a run of pixels of the determined length.
Determine the colour and opacity values for operand B at each pixel position within the determined run length and composite with operand A's pixel data using the compositing operator for the OVER operator.
Write a pixel run for the newly composited pixels.
CASE pixel run over quadratic blend
Calculate A's current run's offset.
Determine the start of the pixel data using the run offset into Operand A.
Calculate B's current run's offset.
Determine B's blend colour and opacity values for the current X position.
Determine B's single difference values for the colour channels for the current X position.
Allocate space for a run of pixels of the determined length.
Determine the colour and opacity values for operand B at each pixel position within the determined run length and composite with operand A's pixel data using the compositing operator for the OVER operator.
Write a pixel run for the newly composited pixels.
CASE pixel run over pixel run
Calculate A's current run's offset.
Determine the start of A's pixel data using the run offset into Operand A.
Calculate B's current run's offset.
Determine the stat of B's pixel data using the run offset into Operand B.
Allocate space for a run of pixels of the determined length.
Composite pixels from A's and B's pixel runs together using the OVER operator for the determined run length.
Write a pixel run for the newly composited pixels.
CASE transparent run over flat colour
Write a flat colour run of the same colour as the run from operand B and with the determined length.
CASE transparent run over linear blend
Calculate B's current run's offset.
Determine B's blend colour and capacity values for the current X position.
Write a linear blend run using the determined start colour and opacity and operand B's colour and opacity differences.
CASE transparent run over quadratic blend
Calculate B's current run's offset.
Determine B's blend colour and opacity values for the current X position.
Determine B's single difference values for the colour channels for the current X position.
Write a quadratic blend run using the determined start colours, start opacity, start single colour differences and using operand B's double differences.
CASE transparent run over pixel run
Determine the address with the operand B pixel data equivalent to the current X position.
Allocate space for a run of pixels of the determined length.
Write a pixel run copying the required number of pixels from the determined address.
CASE transparent run over transparent run
Write a transparent run of the determined length.
CASE flat colour over transparent run
Write a flat colour run of the same colour as the run from operand A and with the determined length.
CASE linear blend over transparent run
Calculate A's current run's offset.
Determine A's blend colour and opacity values for the current X position.
Write a linear blend run using the determined start colour and opacity and operand A's colour and opacity differences.
CASE quadratic blend over transparent run
Calculate A's current run's offset.
Determine A's blend colour and opacity values for the current X position.
Determine A's single difference values for the colour channels for the current X position.
Write a quadratic blend run using the determined start colours, start opacity, start single colour differences and using operand A's double differences.
CASE pixel run over transparent run
Calculate A's current run's offset.
Determine the start of the pixel data using the run offset into Operand A.
Allocate space for a run of pixels of the determined length.

Write a pixel run copying the required number of pixels from the determined address.
ENDCASE
Insert the new run in the next position in the new span.
IF span is not completed
THEN
   IF we are at the end of A's current run
   THEN
     Advance to A's next run.
   ENDIF
   IF we are at the end of B's current run
   THEN
     Advance to B's next run.
   ENDIF
ENDIF
ENDIF
ENDDO
Write a delimiter to indicate the end of the span.
  ENDDO
  END run_over_run
run_over_pixmap
  Parameters:
    Instance
    Operand A (run-based)
    Operand B (pixmap)
    Result Proxy
    Scan line number
    Linked list of required spans
  BEGIN run_over_pixmap
    Locate the head of the list of runs within the result proxy for the given scan line number.
    FOR each span in the linked list
    DO
      Locate the current scan line in Operand A.
      Locate the run and offset within that run for operand A at which this span starts. NOTE that apart from the first run for each span the starting offset for A's run prior to compositing will always be zero. Coding should be optimized to take advantage of this fact.
      Determine the pixel address where the span starts in Operand B.
      DO UNTIL span is completed
      IF run from Operand A is opaque
      THEN
        Calculate the length of the new run as the minimum of the remaining length of A's run and the distance from the current X position to the end of the span.
      CASENTRY operand A run type
      CASE flat colour
        Write a flat colour run of the same colour as the run from operand A and with the determined length.
      CASE pixel run
        Determine the address within the operand A pixel data equivalent to the current X position.
        Allocate space for a run of pixels of the determined length.
        Write a pixel run copying the required number of pixels from the determined address.
      CASE linear colour or opacity blend
        Determine the blend colour and opacity values for the current X position.
        Write a linear blend run using the determined start colour and opacity and operand A's colour and capacity differences.
      CASE quadratic blend
        Determine the blend colour and opacity values for the current X position.
        Determine the single difference values for the colour channels for the current X position.
        Write a quadratic blend run using the determined start colours, start opacity, start single colour differences and using operand A's double differences.
      ENDCASE
      Insert the new run in the next position in the new span.
      ELSE
        Determine the length of the new run as minimum of the remaining span length and the remaining length of the run from operand A from the current X position.
        CASENTRY Operand A run type
        CASE flat colour
          Determine the start of the pixel data in Operand B.
          Allocate space for a run of pixels of the determined length.
          Composite each pixel in B's data from the determined offset with the flat colour using the OVER compositing operator.
          Write a pixel run for the newly composited pixels.
        CASE linear blend
          Determine the start of the pixel data in Operand B.
          Determine A's blend colour and opacity values for the current X position.
          Allocate space for a run of pixels of the determined length.
          Determine the colour and opacity values for operand A at each pixel position within the determined run length and composite with operand B's pixel data using the compositing operator for the OVER operator.
          Write a pixel run for the newly composited pixels.
        CASE quadratic blend
          Determine the start of the pixel data in Operand B.
          Determine A's blend colour and opacity values for the current X position.
          Determine A's single difference values for the colour channels for the current X position.
          Allocate space for a run of pixels of the determined length.
          Determine the colour and opacity values for operand A at each pixel position within the determined run length and composite with operand B's pixel data using the compositing operator for the OVER operator.
          Write a pixel run for the newly composited pixels.
        CASE pixel run
          Determine the start of the pixel data using the run offset in to Operand A.
          Determine the start of the pixel data in Operand B.
          Allocate space for a run of pixels of the determined length.
          Composite pixels from A's and B's pixel runs together using the OVER operator for the determined run length.
          Write a pixel run for the newly composited pixels.
        CASE transparent run
          Allocate space for a run of pixels of the determined length.
          Copy pixels from B's pixel data to the allocated data space.
          Write a pixel run for the newly composited pixels.
        ENDCASE ENDIF
F the span is not completed.
THEN
   Step to the next run within Operand A at offset zero. Advance the pixel pointer in Operand B by the length of the newly written run.
ENDIF
ENDDO
Write a delimiter to indicate the end of the span.
ENDFOR
END run_over_pixmap
run_over_planefill
  Parameters:
    Instance
    Operand A (run-based)
    Operand B (plane fill)
    Result Proxy
    Scan line number
    Linked list of required spans
  BEGIN run_over_planefill
    Locate the head of the list of runs within the result proxy for the given scan line number.
    FOR each span in the linked list
    DO
      Locate the current scan line in Operand A.
      Locate the run and offset within that run for operand A at which this span starts. NOTE that apart from the first run for each span the starting offset for A's run prior to compositing will always be zero. Coding should be optimized to take advantage of this fact.
      DO UNTIL span is completed IF run from Operand A is opaque
      THEN
        Calculate the length of the new run as the minimum of the remaining length of A's run and the distance from the current X position to the end of the span.
      CASENTRY operand A run type
        CASE flat colour
          Write a flat colour run of the same colour as the run from operand A and with the determined length.
        CASE pixel run
          Determine the address within the operand A pixel data equivalent to the current X position.
          Allocate space for a run of pixels of the determined length.
          Write a pixel run copying the required number of pixels from the determined address.
        CASE linear colour or opacity blend
          Determine the blend colour and opacity values for the current X position.
          Write a linear blend run using the determined start colour and opacity and operand A's colour and opacity differences.
        CASE quadratic blend
          Determine the blend colour and opacity values for the current X position.
          Determine the single difference values for the colour channels for the current X position.
          Write a quadratic blend run using the determined start colours, start opacity, start single colour differences and using operand A's double differences.
      ENDCASE
      Insert the new run in the next position in the new span.
      ELSE
        Determine the length of the new run as minimum of the remaining span length and the remaining length of the run from operand A from the current X position.
      CASEENTRY Operand A type
        CASE flat colour
          Determine the composite flat colour and opacity using the OVER compositing operator. Write a flat colour run using the determined colour and opacity.
        CASE linear blend
          Determine A's blend colour and opacity values for the current X position.
          Using the determined start colour and the flat colour set up the parameters for the new linear blend. The colour and opacity channels being:
            channel A+(1-opacity A)* channel B
          The colour differences being:
            colour difference A- (opacity difference A* colour B)
          The opacity difference being:
            opacity difference A- (opacity difference A* opacity B)
          Write a linear blend run using the determined start colour and opacity and the determined colour and opacity differences.
        CASE quadratic blend
          Determine A's blend colour and opacity values for the current X position.
          Determine A's single difference values for the colour channels for the current X position.
          Using A's determined start colour, determined single differences and constant double differences together with B's flat colour and opacity values set up the parameters for the new quadratic blend. The colour and opacity channels being:
            channel A+(1-opacity A)* channel B
          The colour differences being:
            colour difference A- (opacity difference A* colour B)
          The opacity differences being:
            opacity difference A- (opacity difference A* opacity B)
          The double differences being copies of
          A's double differences.
          Write a quadratic blend run using the determined start colours, start opacity, start single colour differences and A's double differences.
        CASE pixel run
          Determine the start of the pixel data using the run offset into Operand A.
          Allocate space for a run of pixels of the determined length.
          Composite each pixel in A's data from the determined offset with the flat colour using the OVER compositing operator.
          Write a pixel run for the newly composited pixels.
        CASE transparent run
          Write a flat colour run of the same colour as the run from operand B and with the determined length.
      ENDCASE Ins
ert new run in next position in new span.
ENDIF
IF the span is not completed
THEN
   Step to the next run within Operand A.
ENDIF ENDDO
    Write a delimiter to indicate the end of the span. END
DO
END run_over_planefill
pixmap_over_run
  Parameters:
    Instance
    Operand A (pixmap)
    Operand B (run-based)
    Result Proxy
    Scan line number
    Linked list of required spans
  BEGIN pixmap_over_run
    Locate the head of the list of runs within the result proxy for the given scan line number.
    FOR each span in the linked list
    DO
      Locate the current scan line in Operand B.
      Locate the run and offset within that run for operand B at which this span starts. NOTE that apart from the first run for each span the starting offset for B's run prior to compositing will always be zero. Coding should be optimized to take advantage of this fact.
      Determine the pixel address where the span starts in Operand A.
      DO UNTIL span is completed
        Determine the length of the new run as minimum of the remaining span length and the remaining length of the run from operand B from the current X position.
      CASEENTRY Operand B run type
        CASE flat colour
          Determine the start of the pixel data in Operand A.
          Allocate space for a run of pixels of the determined length.
          Composite each pixel in A's data from the determined offset with the flat colour using the OVER compositing operator.
          Write a pixel run for the newly composited pixels.
        CASE linear blend
          Determine the start of the pixel data in Operand A.
          Calculate B's current run's offset.
          Determine B's blend colour and opacity values for the current X position.
          Allocate space for a run of pixels of the determined length.
          Determine the colour and opacity values for operand B at each pixel position within the determined run length and composite with operand A's pixel data using the compositing operator for the OVER operator.
          Write a pixel run for the newly composited pixels.
        CASE quadratic blend
          Determine the start of the pixel data in Operand A.
          Calculate B's current run's offset.
          Determine B's blend colour and opacity values for the current X position.
          Determine B's single difference values for the colour channels for the current X position.
          Allocate space for a run of pixels of the determined length.
          Determine the colour and opacity values for operand B at each pixel position within the determined run length and composite with operand A's pixel data using the compositing operator for the OVER operator.
          Write a pixel run for the newly composited pixels.
        CASE pixel run
          Determine the start of the pixel data in Operand A.
          Calculated B's current run's offset.
          Determine the start of B's pixel data using the run offset into Operand B.
          Allocate space for a run of pixels of the determined length.
          Composite pixels from A's and B's pixel runs together using the OVER operator for the determined run length.
          Write a pixel run for the newly composited pixels.
        CASE transparent run
          Determine the start of the pixel data in Operand A.
          Allocate space for a run of pixels of the determined length.
          Write a pixel run copying the required number of pixels from the determined address.
      ENDCASE
      Insert new run in next position in new span.
      IF the span is not completed
      THEN
        Step to the next run within Operand B at offset zero.
        Advance the pixel pointer in Operand A by the length of the newly written run.
      ENDIF
    ENDDO
    Write a delimiter run to indicate the end of the span.
  ENDDO
END pixmap_over_run
planefill_over_run
  Parameters:
    Instance
    Operand A (plane fill)
    Operand B (run-based)
    Result Proxy
    Scan line number
    Linked list of required spans
  BEGIN planefill_over_run
    Locate the head of the list of runs within the result proxy for the given scan line number.
    FOR each span in the linked list
    DO
      Locate the current scan line in Operand B.
      Locate the run and offset within that run for operand B at which this span starts. NOTE that apart from the first run for each span the starting offset for B's run prior to compositing will always be zero. Coding should be optimized to take advantage of this fact.
      DO UNTIL span is completed
        Determine the length of the new run as minimum of the remaining span length and the remaining length of the run from operand B from the current X position.
      CASENTRY Operand B run type
        CASE flat colour
          Determine the composite flat colour and opacity using the OVER compositing operator.
          Write a flat colour run using the determined colour and opacity.
        CASE linear blend
          Calculate B's current run's offset.
          Determine B's blend colour and opacity values for the current X position.

Using the determined start colour and the flat colour set up the parameters for the new linear blend. The colour and opacity channels being:
  channel A+(1-opacity A)* channel B
The colour and opacity differences being:
  (1-opacity A)* difference B
Write a linear blend run using the determined start colour and opacity and the determined colour and opacity differences.
CASE quadratic blend
  Calculate B's current run's offset.
  Determine B's blend colour and opacity values for the current X position.
  Determine B's single difference values for the colour channels for the current X position.
  Using B's determined start colour, determined single differences and constant double differences together with A's flat colour and opacity values set up the parameters for the new quadratic blend. The colour and opacity channels being:
    channel A+(1-opacity A)* channel B
  The colour and opacity differences being:
    (1-opacity A)* difference B
  The colour and opacity double differences being:
    (1-opacity A)* double difference B
  Write a quadratic blend run using the determined start colours, start opacity, start single colour differences and determined double differences.
CASE pixel run
  Calculate B's current run's offset.
  Determine the start of the pixel data using the run offset into Operand B.
  Allocate space for a run of pixels of the determined length.
  Composite the flat colour with each pixel in B's data from the determined offset using the OVER compositing operator.
  Write a pixel run for the newly composited pixels.
CASE transparent run
  Write a flat colour run using A's colour and opacity data.
ENDCASE
Insert the new run in the next position in the new span.
IF the span is not completed
THEN
  Step to the next run within Operand B at offset zero.
ENDIF
ENDDO
Write a delimiter to indicate the end of the span.
ENDDO
END planefill_over_run

What is claimed is:

1. A method of compositing two input runs of image data to produce at least one output run of image data, each of the two input runs being categorised by one of a plurality of data types, the method comprising the steps of:

determining a data type for the output run from the data types of the two input runs and a predetermined compositing operation, at least one of the data types of the two input runs being a colour blend or opacity blend of at least linear degree;

applying the predetermined compositing operation to the two input runs to determine at least a colour difference value or an opacity difference value at an area of intersection of the two input runs, said area of intersection comprising a plurality of pixels represented therein, wherein the determined difference value represents the colour or opacity difference between at least two of said plurality of pixels; and producing the output run according to said output data type utilising the determined colour or opacity difference value.

2. A method according to claim 1, comprising the further step of adjusting at least one of the input runs at an area not corresponding to the area of intersection to permit further compositing thereof.

3. A method of compositing two input images to form at least one output image, each of the input images being formed of scan lines comprising run-based data and each input run being categorised by one of a plurality of data types, the method comprising the steps of:

for each output scan line:

selecting a first scan line from the first image and a second scan line from the second image; and for each area of intersection of a first of two input runs from said first scan line and a second of two input runs from said second scan line:

determining a data type for an output run from the data types of the first run and the second run, and a predetermined operation, at least one of the data types of the first run and the second run being a colour blend or opacity blend of at least linear degree:

applying the predetermined compositing operation to the first and second input runs to determine at least a colour difference value or an opacity difference value at an area of intersection of the first and second input runs, said area of intersection comprising a plurality of pixels represented therein, wherein the determined difference value represents the colour or opacity difference between at least two of said plurality of pixels;

producing the output run of image data according to said output data type utilising the determined colour or opacity difference value;

adjusting said first input run selected from said first scan line or selecting a new run from said first scan line to permit further compositing; and adjusting said second input run selected from said second scan line or selecting a new run from said second scan line to permit further compositing.

4. A method according to claim 1 or 3, wherein said plurality of data types are selected from the group consisting of:
  (i) flat colour;
  (ii) linear colour blends,
  (iii) colour blends of polynomial degree a, where a=2, 3, 4, . . . ;
  (iv) flat colour and opacity;
  (v) linear colour and opacity blends;
  (vi) colour and opacity blends of polynomial degree a, where a=2, 3, 4, . . . ;
  (vii) completely transparent data; and
  (viii) runs of pixel data.

5. A method according to claim 4, wherein at least one of said input runs comprises a combination of said data types.

6. A method according to claim 5, wherein said input runs and said output run comprise both colour and opacity data.

7. A method according to claim 1, wherein said predetermined compositing operation is selected from the group consisting of OVER, IN, OUT, ATOP, PLUS, AND, XOR and UPON.

8. A method according to claim 7, wherein said producing said output run comprises the sub-step of determining a starting colour and opacity for said output run using at least one of said predetermined compositing operations.

9. A method according to claim 8, wherein said producing said output run comprises compositing a flat run OVER a linear blend run to produce a linear blend run.

10. A method according to claim 9, wherein said producing said output run comprises the sub-step of determining the colour or opacity difference value corresponding to said output run in accordance with the following equation:

$$\Delta(<a_{co},a_o> \text{ over } <b_{co},b_o>)=(1-a_o)\Delta<b_{co},b_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

11. A method according to claim 8, wherein said producing said output run comprises compositing a flat run OVER a quadratic blend run to produce a quadratic blend run.

12. A method according to claim 11, wherein said producing said output run comprises the sub-steps of:

determining the colour or opacity difference value corresponding to said output run in accordance with the following equation:

$$\Delta(<a_{co},a_o> \text{ over } <b_{co},b_o>)=(1-a_o)\Delta<b_{co},b_o>; \text{ and}$$

determining at least one colour double difference value corresponding to said output run in accordance with the following equation:

$$\Delta\Delta(<a_{co},a_o> \text{ over } <b_{co},b_o>)=(1-a_o)<\Delta\Delta b_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

13. A method according to claim 8, wherein said producing said output run comprises compositing a linear blend run OVER a flat run to produce a linear blend run.

14. A method according to claim 13, wherein said producing said output run comprises the sub-step of determining the colour or opacity difference value corresponding to said output run in accordance with the following equation:

$$\Delta(<a_{co},a_o> \text{ over } <b_{co},b_o>)=\Delta<a_{co},a_o>-\Delta a_o<b_{co},b_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

15. A method according to claim 8, wherein said producing said output run comprises compositing a quadratic blend run OVER a flat run to produce a quadratic blend run.

16. A method according to claim 15, wherein said producing said output run comprises the sub-steps of:

determining the colour or opacity difference value between the input run-based data corresponding to said output run in accordance with the following equation:

$$\Delta(<a_{co},a_o> \text{ over } <b_{co},b_o>)=\Delta<a_{co},a_o>-\Delta a_o<b_{co},b_o>; \text{ and}$$

determining at least one colour double difference value corresponding to said output run in accordance with the following equation:

$$\Delta\Delta(<a_{co},a_o> \text{ over } <b_{co},b_o>)=<\Delta\Delta a_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

17. A method according to claim 8, wherein said producing said output run comprises compositing a flat run IN a linear blend run to produce a linear blend run.

18. A method according to claim 8, wherein said producing said output run comprises compositing a flat run IN a quadratic blend run to produce a quadratic blend run.

19. A method according to claim 8, wherein said producing said output run comprises compositing a linear blend run IN a flat run to produce a linear blend run.

20. A method according to any one of claim 17, 18, or 19, wherein said producing said output run comprises the sub-step of determining the colour or opacity difference value corresponding to said output run in accordance with the following equation:

$$\Delta(<a_{co},a_o> \text{ in } <b_{co},b_o>)=\Delta b_o<a_{co},a_o>, \text{ and wherein:}$$

$a_{co}$ represent a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

21. A method according to claim 8, wherein said producing said output run comprises compositing a quadratic blend run IN a flat run to produce a quadratic blend run.

22. A method according to claim 21, wherein said producing said output run comprises the sub-steps of:

determining the colour or opacity difference value corresponding to said output run in accordance with the following equation:

$$\Delta(<a_{co},a_o> \text{ in } <b_{co},b_o>)=b_o\Delta<a_{co},a_o>; \text{ and}$$

determining at least one colour double difference value corresponding to said output run in accordance with the following equation:

$$\Delta\Delta(<a_{co},a_o> \text{ in } <b_{co},b_o>)=<b_o\Delta\Delta a_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

23. A method according to claim 8, wherein said producing said output run comprises compositing a flat run OUT a linear blend run to produce a linear blend run.

24. A method according to claim 8, wherein said producing said output run comprises compositing a flat run OUT a quadratic blend run to produce a linear blend run.

25. A method according to any one of claim 23 or 24, wherein said producing said output run comprises the sub-step of determining the colour or opacity difference value corresponding to said output run in accordance with the following equation:

$$\Delta(<a_{co},a_o> \text{ out } <b_{co},b_o>)=-\Delta b_o<a_{co},a_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

26. A method according to claim 8, wherein said producing said output run comprises compositing a linear blend run OUT a flat run to produce a linear blend run.

27. A method according to claim 26, wherein said producing said output run comprises the sub-step of determining the colour or opacity difference value corresponding to said output run in accordance with the following equation:

$$\Delta(<a_{co},a_o> \text{ out } <b_{co},b_o>)=(1-b_o)\Delta<a_{co},a_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

28. A method according to claim 8, wherein said producing said output run comprises compositing a quadratic blend run OUT a flat run to produce a quadratic blend run.

29. A method according to claim 28, wherein said producing said output run comprises the sub-steps of:

determining the colour or opacity difference value corresponding to said output run in accordance with the following equation:

$$\Delta(<a_{co},a_o> \text{ out } <b_{co},b_o>)=(1-b_o)\Delta<a_{co},a_o>; \text{ and}$$

determining at least one colour double difference value corresponding to said output run in accordance with the following equation:

$$\Delta\Delta(<a_{co},a_o> \text{ out } <b_{co},b_o>)=<(1-b_o)\Delta\Delta a_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

30. A method according to claim 8, wherein said producing said output run comprises compositing a flat run ATOP a linear blend run to produce a linear blend run.

31. A method according to claim 30, wherein said producing said output run comprises the sub-step of determining the colour or opacity difference value corresponding to said output run in accordance with the following equation:

$$\Delta(<a_{co},a_o> \text{ atop } <b_{co},b_o>)=(1-a_o)\Delta<b_{co},b_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

32. A method according to claim 8, wherein said producing said output run comprises compositing a flat run ATOP a quadratic blend run to produce a quadratic blend run.

33. A method according to claim 32, wherein said producing said output run comprises the sub-steps of:

determining the colour or opacity difference value corresponding to said output run in accordance with the following equation:

$$\Delta(<a_{co},a_o> \text{ atop } <b_{co},b_o>)=(1-a_o)\Delta<b_{co},b_o>; \text{ and}$$

determining at least one colour double difference value corresponding to said output run in accordance with the following equation:

$$\Delta\Delta(<a_{co},a_o> \text{ atop } <b_{co},b_o>)=<(1-a_o)\Delta\Delta b_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

34. A method according to claim 8, wherein said producing said output run comprises compositing a linear blend run ATOP a flat run to produce a linear blend run.

35. A method according to claim 34, wherein said producing said output run comprises the sub-step of determining the colour or opacity difference value corresponding to said output run in accordance with the following equation:

$$\Delta(<a_{co},a_o> \text{ atop } <b_{co},b_o>)=<b_o\Delta a_{co}-b_{co}\Delta a_o,0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

36. A method according to claim 8, wherein said producing said output run comprises compositing a linear blend run ATOP a linear blend run to produce a quadratic blend run.

37. A method according to claim 36, wherein said producing said output run comprises the sub-steps of:

determining the colour or opacity difference value corresponding to said output run in accordance with the following equation:

$$\Delta(<a_{co},a_o> \text{ atop } <b_{co},b_o>)=<(a_{co}+\Delta a_{co})\Delta b_{co}+(1-a_o-\Delta ao)\Delta b_{co}+b_o\Delta a_{co}-b_{co}\Delta a_o,\Delta b_o); \text{ and}$$

determining at least one colour double difference value between the input run-based data corresponding to said output run in accordance with the following equation:

$$\Delta\Delta(<a_{co},a_o> \text{ atop } <b_{co},b_o>)=<2(\Delta b_o\Delta a_{co}-\Delta a_o\Delta b_{co}),0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

38. A method according to claim 8, wherein said producing said output run comprises compositing a quadratic blend run ATOP a flat run to produce a quadratic blend run.

39. A method according to claim 38, wherein said producing said output run comprises the sub-steps of:

determining the colour or opacity difference value corresponding to said output run in accordance with the following equation:

$$\Delta(<a_{co},a_o> \text{ atop } <b_{co},b_o>)=<b_o\Delta a_{co}-b_{co}\Delta a_o,0); \text{ and}$$

determining at least one colour double difference value corresponding to said output run in accordance with the following equation:

$$\Delta\Delta(<a_{co},a_o> \text{ atop } <b_{co},b_o>)=<b_o\Delta\Delta a_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

40. A method according to claim 8, wherein said producing said output run comprises compositing a flat run UPON a linear blend run to produce a linear blend run.

41. A method according to claim 40, wherein said producing said output run comprises the sub-step of determining the colour or opacity difference value corresponding to said output run in accordance with the following equation:

$$\Delta(<a_{co},a_o> \text{ upon } <b_{co},b_o>)=\Delta b_o<a_{co},a_o>+\Delta<b_{co},b_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

42. A method according to claim 8, wherein said producing said output run comprises compositing a flat run UPON a quadratic blend run to produce a quadratic blend run.

43. A method according to claim 42, wherein said producing said output run comprises the sub-steps of:

determining the colour or opacity difference value corresponding to said output run in accordance with the following equation:

$$\Delta(<a_{co},a_o> \text{ upon } <b_{co},b_o>)=\Delta b_o<a_{co},a_o>+\Delta<b_{co},b_o>; \text{ and}$$

determining at least one colour double difference value corresponding to said output run in accordance with the following equation:

$$\Delta\Delta(<a_{co},a_o> \text{ upon } <b_{co},b_o>)=<\Delta\Delta b_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

44. A method according to claim 8, wherein said producing said output run comprises compositing a linear blend run UPON a flat run to produce a linear blend run.

45. A method according to claim 44, wherein said producing said output run comprises the sub-step of determining the colour or opacity difference value corresponding to said output run in accordance with the following equation:

$$\Delta(a_{co},a_o> \text{ upon } <b_{co},b_o>)=b_o\Delta<a_{co},a_o>, \text{ and wherein:}$$

$a_{co}$ represents a premultiplied colour data for a left operand of said predetermined compositing operation;
$b_{co}$ represents a premultiplied colour data for a right operand of said predetermined compositing operation;
$a_o$ represents an opacity channel data for the left operand;
$b_o$ represents an opacity channel data for the right operand; and
$\Delta$ represents a forward difference.

46. A method according to claim 8, wherein said producing said output run comprises compositing a quadratic blend run UPON a flat run to produce a quadratic blend run.

47. A method according to claim 46, wherein said producing said output run comprises the sub-steps of:
determining the colour and opacity difference value corresponding to said output run in accordance with the following equation:

$$\Delta(<a_{co},a_o> \text{ upon } <b_{co},b_o>)=b_o\Delta<a_{co},a_o>; \text{ and}$$

determining at least one colour double difference value corresponding to said output run in accordance with the following equation:

$$\Delta\Delta(<a_{co},a_o> \text{ upon } <b_{co},b_o>)=<\Delta\Delta a_{co},0>, \text{ and wherein:}$$

$a_{co}$ represents a premultiplied colour data for a left operand of said predetermined compositing operation;
$b_{co}$ represents a premultiplied colour data for a right operand of said predetermined compositing operation;
$a_o$ represents an opacity channel data for the left operand;
$b_o$ represents an opacity channel data for the right operand;
$\Delta$ represents a forward difference; and
$\Delta\Delta$ represents a second forward difference.

48. A method according to claim 8, wherein said producing said output run comprises compositing a flat run XOR a linear blend run to produce a linear blend run.

49. A method according to claim 48, wherein said producing said output run comprises the sub-step of determining the colour or opacity difference value corresponding to said output run in accordance with the following equation:

$$\Delta(<a_{co},a_o> \text{ xor } <b_{co},b_o>)=-\Delta b_o<a_{co},a_o>+(1-a_o)\Delta<b_{co},b_o>, \text{ and wherein:}$$

$a_{co}$ represents a premultiplied colour data for a left operand of said predetermined compositing operation;
$b_{co}$ represents a premultiplied colour data for a right operand of said predetermined compositing operation;
$a_o$ represents an opacity channel data for the left operand;
$b_o$ represents an opacity channel data for the right operand; and
$\Delta$ represents a forward difference.

50. A method according to claim 8, wherein said producing said output run comprises compositing a flat run XOR a quadratic blend run to produce a quadratic blend run.

51. A method according to claim 50, wherein said producing said output run comprises the sub-steps of:
determining the colour and opacity difference value corresponding to said output run in accordance with the following equation:

$$\Delta(<a_{co},a_o> \text{ xor } <b_{co},b_o>)=-\Delta b_o<a_{co},a_o>+(1-a_o)\Delta<b_{co},b_o>; \text{ and}$$

determining at least one colour double difference value corresponding to said output run in accordance with the following equation:

$$\Delta(<a_{co},a_o> \text{ xor } <b_{co},b_o>)=<(1-a_o)\Delta\Delta b_{co},0>, \text{ and wherein:}$$

$a_{co}$ represents a premultiplied colour data for a left operand of said predetermined compositing operation;
$b_{co}$ represents a premultiplied colour data for a right operand of said predetermined compositing operation;
$a_o$ represents an opacity channel data for the left operand;
$b_o$ represents an opacity channel data for the right operand;
$\Delta$ represents a forward difference; and
$\Delta\Delta$ represents a second forward difference.

52. A method according to claim 8, wherein said producing said output run comprises compositing a linear blend run XOR a flat run to produce a linear blend run.

53. A method according to claim 52, wherein said producing said output run comprises the sub-step of determining the colour or opacity difference value corresponding to said output run in accordance with the following equation:

$$\Delta(<a_{co},a_o> \text{ xor } <b_{co},b_o>)=-\Delta a_o<b_{co},b_o>+(1-b_o)\Delta<a_{co},a_o>, \text{ and wherein:}$$

$a_{co}$ represents a premultiplied colour data for a left operand of said predetermined compositing operation;
$b_{co}$ represents a premultiplied colour data for a right operand of said predetermined compositing operation;
$a_o$ represents an opacity channel data for the left operand;
$b_o$ represents an opacity channel data for the right operand; and
$\Delta$ represents a forward difference.

54. A method according to claim 8, wherein said producing said output run comprises compositing a quadratic blend run XOR a flat run to produce a quadratic blend run.

55. A method according to claim 54, wherein said producing said output run comprises the sub-steps of:
determining the colour or opacity difference value corresponding to said output run in accordance with the following equation:

$$\Delta(<a_{co},a_o> \text{ xor } <b_{co},b_o>)=-\Delta a_o<b_{co},b_o>+(1-b_o)\Delta<a_{co},a_o>; \text{ and}$$

determining at least one colour double difference value corresponding to said output run in accordance with the following equation:

$$\Delta(<a_{co},a_o> \text{ xor } <b_{co},b_o>)=<(1-b_o)\Delta\Delta a_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

56. A method according to claim 8, wherein said producing said output run comprises compositing a flat run PLUS a linear blend run to produce a linear blend run.

57. A method according to claim 56, wherein said producing said output run comprises the sub-step of determining the colour or opacity difference value corresponding to said output run in accordance with the following equation:

$$\Delta(<a_{co},a_o> \text{ plus } <b_{co},b_o>)=\Delta<b_{co},b_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

58. A method according to claim 8, wherein said producing said output run comprises compositing a flat run PLUS a quadratic blend run to produce a quadratic blend run.

59. A method according to claim 58, wherein said producing said output run comprises the sub-steps of:

determining the colour or opacity difference value corresponding to said output run in accordance with the following equation:

$$\Delta(<a_{co},a_o> \text{ plus } <b_{co},b_o>)=\Delta<b_{co},b_o>; \text{ and}$$

determining at least one colour double difference value corresponding to said output run in accordance with the following equation:

$$\Delta(<a_{co},a_o> \text{ plus } <b_{co},b_o>)=<\Delta\Delta b_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

60. A method according to claim 8, wherein said producing said output run comprises compositing a linear blend run PLUS a linear blend run to produce a linear blend run.

61. A method according to claim 60, wherein said producing said output run comprises the sub-step of determining the colour or opacity difference value corresponding to said output run in accordance with the following equation:

$$\Delta(<a_{co},a_o> \text{ plus } <b_{co},b_o>)=\Delta<a_{co},a_o>+\Delta<b_{co},b_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

62. A method according to claim 8, wherein said producing said output run comprises compositing a linear blend run PLUS a quadratic blend run to produce a quadratic blend run.

63. A method according to claim 62, wherein said producing said output run comprises the sub-steps of:

determining the colour or opacity difference value corresponding to said output run in accordance with the following equation:

$$\Delta(<a_{co},a_o> \text{ plus } <b_{co},b_o>)=\Delta<a_{co},a_o>+\Delta<b_{co},b_o>; \text{ and}$$

determining at least one colour double difference value corresponding to said output run in accordance with the following equation:

$$\Delta\Delta(<a_{co},a_o> \text{ plus } <b_{co},b_o>)=<\Delta\Delta b_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

64. A method according to claim 8, wherein said producing said output run comprising compositing a quadratic blend run PLUS a flat run to produce a quadratic blend run.

65. A method according to claim 64, wherein said producing said output run comprises the sub-steps of:

determining the colour and opacity difference value corresponding to said output run in accordance with the following equation:

$$\Delta(<a_{co},a_o> \text{ plus } <b_{co},b_o>)=\Delta<a_{co},a_o>; \text{ and}$$

determining at least one colour double difference value corresponding to said output run in accordance with the following equation:

$$\Delta(<a_{co},a_o> \text{ plus } <b_{co},b_o>)=<(\Delta\Delta a_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

66. A method according to claim 8, wherein said producing said output run comprises compositing a quadratic blend run PLUS a linear blend run to produce a quadratic blend run.

67. A method according to claim 66, wherein said producing said output run comprises the sub-steps of:

determining the colour and opacity difference value corresponding to said output run in accordance with the following equation:

$$\Delta(<a_{co},a_o> \text{ plus } <b_{co},b_o>)=\Delta<b_{co},b_o>+\Delta<a_{co},a_o>; \text{ and}$$

determining at least one colour double difference value corresponding to said output run in accordance with the following equation:

$$\Delta\Delta(<a_{co},a_o> \text{ plus } <b_{co},b_o>)=<\Delta\Delta a_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

68. A method according to claim 8, wherein said producing said output run comprises compositing a quadratic blend run PLUS a quadratic blend run to produce a quadratic blend run.

69. A method according to claim 68, wherein said producing said output run comprises the sub-steps of:

determining the colour or opacity difference value corresponding to said output run in accordance with the following equation:

$$\Delta(<a_{co},a_o> \text{ plus } <b_{co},b_o>)=\Delta<a_{co},a_o>+\Delta<b_{co},b_o>; \text{ and}$$

determining at least one colour double difference value corresponding to said output run in accordance with the following equation:

$$\Delta\Delta(<a_{co},a_o> \text{ plus } <b_{co},b_o>)=<\Delta\Delta a_{co}+\Delta\Delta b_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

70. A method according to claim 8, wherein said producing said output run comprises compositing a flat run AND a linear blend run to produce a linear blend run.

71. A method according to claim 70, wherein said producing said output run comprises the sub-step of determining the colour or opacity difference value corresponding to said output run in accordance with the following equation:

$$\Delta(<a_{co},a_o> \text{ and } <b_{co},b_o>)=<a_{co}\Delta b_o+a_o\Delta b_{co},2_{co}\Delta b_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

72. A method according to claim 8, wherein said producing said output run comprises compositing a flat run AND a quadratic blend run to produce a quadratic blend run.

73. A method according to claim 72, wherein said producing said output run comprises the sub-steps of:

determining the colour or opacity difference value corresponding to said output run in accordance with the following equation:

$$\Delta(<a_{co},a_o> \text{ and } <b_{co},b_o>)=<a_{co}\Delta b_o+a_o\Delta b_{co},2_{co}\Delta b_o>; \text{ and}$$

determining at least one colour double difference value corresponding to said output run in accordance with the following equation:

$$\Delta(<a_{co},a_o> \text{ and } <b_{co},b_o>)=<a_{co}\Delta\Delta b_{co},0>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand;

$\Delta$ represents a forward difference; and $\Delta\Delta$ represents a second forward difference.

74. A method according to claim 8, wherein said producing said output run comprises compositing a linear blend run AND a flat run to produce a linear blend run.

75. A method according to claim 74, wherein said producing said output run comprises the sub-step of determining the colour or opacity difference value corresponding to said output run in accordance with the following equation:

$$\Delta(<a_{co},a_o> \text{ and } <b_{co},b_o>)=<b_{co}\Delta a_o+b_o\Delta a_{co},2_{bo}\Delta a_o>, \text{ and wherein:}$$

$a_{co}$ represents a premultiplied colour data for a left operand of said predetermined compositing operation;

$b_{co}$ represents a premultiplied colour data for a right operand of said predetermined compositing operation;

$a_o$ represents an opacity channel data for the left operand;

$b_o$ represents an opacity channel data for the right operand; and $\Delta$ represents a forward difference.

76. A method according to claim 8, wherein said producing said output run comprises compositing a quadratic blend run AND a flat run to produce a quadratic blend run.

77. A method according to claim 76, wherein said producing said output run comprises the sub-steps of:

determining the colour or opacity difference value corresponding to said output run in accordance with the following equation:

$\Delta(<a_{co},a_o>$ and $<b_{co},b_o>)=<b_{co}\Delta a_o+b_o\Delta a_{co},2_{co}\Delta a_o>$; and determining at least one colour double difference value corresponding to said output run in accordance with the following equation:

$\Delta(<a_{co},a_o>$ and $<b_{co},b_o>)=<b_{co}\Delta\Delta a_{co},0>$, and wherein:

$a_{co}$ represents a premultiplied colour data for a left operand of said predetermined compositing operation;
$b_{co}$ represents a premultiplied colour data for a right operand of said predetermined compositing operation;
$a_o$ represents an opacity channel data for the left operand;
$b_o$ represents an opacity channel data for the right operand;
$\Delta$ represents a forward difference; and
$\Delta\Delta$ represents a second forward difference.

78. A method according to claim 7, wherein said producing said output run comprises the sub-step of copying at least one of said input runs.

79. A method according to claim 78, wherein said producing said output run comprises compositing a linear blend run OVER a transparent run to produce a linear blend run.

80. A method according to claim 78, wherein said producing said output run comprises compositing a quadratic blend run OVER a transparent run to produce a quadratic blend run.

81. A method according to claim 78, wherein said producing said output run comprises compositing a transparent run OVER a linear blend run to produce a linear blend run.

82. A method according to claim 78, wherein said producing said output run comprises compositing a transparent run OVER a quadratic blend run to produce a quadratic blend run.

83. A method according to claim 78, wherein said producing said output run comprises compositing a flat run OUT a transparent run to produce a flat run.

84. A method according to claim 78, wherein said producing said output run comprises compositing a linear blend run OUT a transparent run to produce a linear blend run.

85. A method according to claim 78, wherein said producing said output run comprises compositing a quadratic blend run OUT a transparent run to produce a quadratic blend run.

86. A method according to claim 78, wherein said producing said output run comprises compositing a transparent run ATOP a linear blend run to produce a linear blend run.

87. A method according to claim 78, wherein said producing said output run comprises compositing a transparent run ATOP a quadratic blend run to produce a quadratic blend run.

88. A method according to claim 78, wherein said producing said output run comprises compositing a transparent run UPON a linear blend run to produce a linear blend run.

89. A method according to claim 78, wherein said producing said output run comprises compositing a transparent run UPON a quadratic blend run to produce a quadratic blend run.

90. A method according to claim 78, wherein said producing said output run comprises compositing a linear blend run XOR a transparent run to produce a linear blend run.

91. A method according to claim 78, wherein said producing said output run comprises compositing a quadratic blend run XOR a transparent run to produce a quadratic blend run.

92. A method according to claim 78, wherein said producing said output run comprises compositing a transparent run XOR a linear blend run to produce a linear blend run.

93. A method according to claim 78, wherein said producing said output run comprises compositing a transparent run XOR a quadratic blend run to produce a quadratic blend run.

94. A method according to claim 78, wherein said producing said output run comprises compositing a linear blend run PLUS a transparent run to produce a linear blend run.

95. A method according to claim 78, wherein said producing said output run comprises compositing a quadratic blend run PLUS a transparent run to produce a quadratic blend run.

96. A method according to claim 78, wherein said producing said output run comprises compositing a transparent run PLUS a linear blend run to produce a linear blend run.

97. A method according to claim 78, wherein said producing said output run comprises compositing a transparent run PLUS a quadratic blend run to produce a quadratic blend run.

98. A method according to claim 3, wherein said producing said output run comprises examining the data type of said output run to determine a complexity level of implementing said compositing operation, and where said complexity level exceeds a predetermined level of complexity, said compositing operation is performed by decompressing at least one of the input runs to form corresponding pixel data, and said compositing operation is performed on said corresponding pixel data to produce the output run of pixel data.

99. A method according to claim 98 wherein said at least one output run of pixel data is compressed to provide the output run.

100. A method according to claim 98, wherein if the data type of one of the input runs is pixel data, said predetermined level of complexity is deemed exceeded.

101. A method according to claim 98, wherein said predetermined level of complexity comprises a colour polynomial order value m and a transparency polynomial order value n, m and n each being an integer value, said order values being compared with corresponding values of the type of output data of the output run to determine if decompression to pixel data is necessary to perform said compositing operation.

102. A method according to claim 101, wherein m=2 and n=1.

103. A method according to claim 101, wherein m=n=2.

104. A method according to claim 98, wherein the type of input run pairs not requiring decompression to pixel data for compositing are selected from the group consisting of
(i) flat, flat;
(ii) flat, linear;
(iii) flat, quadratic;
(iv) linear, flat; and
(v) quadratic, flat.

105. An apparatus for compositing two input runs of image data to produce at least one output run of image data, each of the two input runs being categorised by one of a plurality of data types, the apparatus comprising:
means for determining a data type for the output run from the data types of the two input runs and a predetermined compositing operation, at least one of the data types of the two input runs being a colour blend or opacity blend of at least linear degree; and
means for applying the predetermined compositing operation to the two input runs to determine at least a colour difference value or an opacity difference value at an area of intersection of the two input runs, said area of intersection comprising a plurality of pixels represented therein, wherein the determined difference value represents the colour or opacity difference between at least two of said plurality of pixels; and means for producing the output run according to the output data type utilising the determined colour or opacity difference value.

106. An apparatus according to claim 105, further comprising means for adjusting at least one of the input runs at an area not corresponding to the area of intersection to permit further compositing thereof.

107. An apparatus for compositing two input images to form at least one output image, each of said input images being formed of scan lines comprising run-based data and each input run being categorised by one of a plurality of data types, the apparatus comprising:

means for selecting a first run from a first scan line of the first image and a second run from a second scan line of the second image for each output scan line;

means for determining a data type for an output run from the data types of the first run and the second run, and a predetermined compositing operation, for each area of intersection of the first run and the second run, at least one of the data types of the first run and the second run being a colour blend or opacity blend of at least linear degree;

means for applying the predetermined compositing operation to the first and second input runs to determine at least a colour difference value or an opacity difference value at an area of intersection of the first and second input runs, said area of intersection comprising a plurality of pixels represented therein, wherein the determined difference value represents the colour or opacity difference between at least two of said plurality of pixels;

means for producing the output run of image data according to said output data type utilising the determined colour or opacity difference value;

means for adjusting the first input run selected from said first scan line or selecting a new run from said first scan line to permit further compositing; and means for adjusting the second input run selected from said second scan line or selecting a new run from said second scan line to permit further compositing.

108. An apparatus method according to claim 105, 106, or 107, wherein said types of data are selected from the group consisting of:
(i) flat colour;
(ii) linear colour blends
(iii) colour blends of polynomial degree a, where a=2, 3, 4, . . . ;
(iv) flat colour and opacity;
(v) linear colour and opacity blends;
(vi) colour and opacity blends of polynomial degree a, where a=2, 3, 4, . . . ;
(vii) completely transparent data; and
(viii) runs of pixel data.

109. An apparatus according to claim 108, wherein at least one of said input runs comprises a combination of said data types.

110. An apparatus according to claim 109, where said input runs and said output runs comprise both colour and opacity data.

111. An apparatus according to claims 105 to 107, wherein said predetermined compositing operation is selected from the group consisting of OVER, IN, OUT, ATOP, PLUS, AND, XOR and UPON.

112. An apparatus according to claim 111, further comprising means for determining a starting colour and opacity for said output run using at least one of said predetermined compositing operations.

113. An apparatus according to claim 107, wherein said producing said output run comprises examining the data type of said output run to determine a complexity level of implementing said compositing operation, and where said complexity level exceeds a predetermined level of complexity, said compositing operation is performed by decompressing at least one of said input runs to form corresponding pixel data, and said compositing operation is performed on said corresponding pixel data to produce the output run of pixel data.

114. An apparatus according to claim 113, wherein said at least one output run of pixel data is compressed to provide said output run.

115. An apparatus according to claim 113, wherein if the data type of one of said input runs is pixel data, said predetermined level of complexity is deemed exceeded.

116. An apparatus according to claim 113, wherein said predetermined level of complexity comprises a colour polynomial order value m and a transparency polynomial order value n, m and n each being an integer value, said order values being compared with corresponding values of the type of output data to determine if decompression to pixel data is necessary to perform said compositing operation.

117. An apparatus according to claim 116, wherein m=2 and n=1.

118. An apparatus according to claim 116, wherein m=n=2.

119. An apparatus according to claim 113, wherein the type of input run pairs not requiring decompression to pixel data for compositing are selected from the group consisting of:
(i) flat, flat;
(ii) flat, linear;
(iii) flat, quadratic;
(iv) linear, flat; and
(v) quadratic, flat.

120. A computer readable medium, having a program recorded thereon, where the program is configured to make a computer execute a procedure to composite two input runs of image data to produce at least one output run of image data, each of the two input runs being categorised by one of a plurality of data types, the program comprising:

code for determining a data type for the output run from the data types of the two input runs and a predetermined compositing operation, at least one of the data types of the two input runs being a colour blend or opacity blend of at least linear degree;

code for applying the predetermined compositing operation to the two input runs to determine at least a colour difference value or an opacity difference value at an area of intersection of the two input runs, said area of intersection comprising a plurality of pixels represented therein, wherein the determined difference value represents the colour or opacity difference between at least two of said plurality of pixels; and means for producing the output run according to said output data type utilising the determined colour or opacity difference value.

121. A computer readable medium, having a program recorded thereon, where the program is configured to make a computer execute a procedure to composite two input images to form at least one output image, each of said input images being formed of scan lines comprising run-based data and each input run being categorised by one of a plurality of data types, the program comprising:

for each output scan line:

code for selecting a first scan line from the first image and a second scan line from the second image; and for each area of intersection of a first of two input runs from said first scan line and a second of two input runs from said second scan line:

code for determining a data type for an output run from the data types of the first run and the second run, and a predetermined compositing operation, at least one of the data types of the first run and the second run being a colour blend or opacity blend of at least linear degree;

code for applying the predetermined compositing operation to the first and second input runs to determine at least a colour difference value or an opacity difference value at an area of intersection of the first and second input runs, said area of intersection comprising a plurality of pixels represented therein, wherein the determined difference value represents the colour or opacity difference between at least two of said plurality of pixels;

code for producing the output run of image data according to said output data type utilising the determined colour or opacity differences value;

code for adjusting the first input run selected from said first scan line or selecting a new run from said first scan line to permit further compositing; and code for adjusting the second input run selected from said second scan line or selecting a new run from said second scan line to permit further compositing.

* * * * *

UNITED STATES PATENT AND TRADEMARK OFFICE
CERTIFICATE OF CORRECTION

PATENT NO. : 6,980,220 B1
APPLICATION NO. : 09/644702
DATED : December 27, 2005
INVENTOR(S) : Politis It is certified that error appears in the above-identified patent and that said Letters Patent is hereby corrected as shown below:

COLUMN 3
Line 9, "leats" should read --least--.
Line 65, "to" should read --with--.

COLUMN 4
Line 13, "to" should read --with--.
Line 21, "leats" should read --least--.
Line 24, "select" should read --selecting--.

COLUMN 9
Line 23, "nay" should read --any--.

COLUMN 13
Line 63, "$-b_o<a_{co},a_o>.$" should read --$\Delta b_o<a_{co},a_o>.$--.

COLUMN 18
Line 4, "$\Delta b_o<a_{co},a_{o>+\Delta<}^{b}{}_{co},b_{o>}.$" should read --$\Delta b_o<a_{co},a_o>_+\Delta<b_{co},b_o>.$--.

COLUMN 19
Line 20, "$b_{co}$" should read --$b_{co}$,--.
Line 21, "Festures" should read --Features--.
Line 50, "$<a_{co}a_o>$" should read --$<a_{co},a_o>$--.

COLUMN 21
Line 27, "$\Delta(<a_{co},ao>$" should read --$\Delta(<a_{co},a_o>$--.

COLUMN 22
Line 1, "plue" should read --plus--.

COLUMN 27
Line 23, "tun 101" should read --run 101--.

COLUMN 32
Line 18, "ENDCASE I" should read --ENDCASE--.
Line 19, "nsert" should read --Insert--.

COLUMN 39
Line 2, "F" should read --IF--.

UNITED STATES PATENT AND TRADEMARK OFFICE
CERTIFICATE OF CORRECTION

PATENT NO. : 6,980,220 B1
APPLICATION NO. : 09/644702
DATED : December 27, 2005
INVENTOR(S) : Politis It is certified that error appears in the above-identified patent and that said Letters Patent is hereby corrected as shown below:

COLUMN 40
Line 60, "Ins" should be deleted.
Line 61, "ert" should read --Insert--.

COLUMN 41
Line 2, "END" should be deleted.
Line 3, "DO" should read --ENDDO--.

COLUMN 44
Line 50, "blends," should read --blends;--.

COLUMN 59
Line 52, "blends" should read --blends;--.

Signed and Sealed this

Fourteenth Day of August, 2007

JON W. DUDAS
*Director of the United States Patent and Trademark Office*